United States Patent
Abotabl et al.

(10) Patent No.: US 12,476,766 B2
(45) Date of Patent: Nov. 18, 2025

(54) ADAPTATION OF A FIRST AVAILABLE RESOURCE BLOCK AND RESOURCE BLOCK GROUP SIZE FOR FULL-DUPLEX COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 17/880,214

(22) Filed: Aug. 3, 2022

(65) Prior Publication Data

US 2024/0048343 A1 Feb. 8, 2024

(51) Int. Cl.
*H04L 5/00* (2006.01)
*H04L 5/14* (2006.01)

(52) U.S. Cl.
CPC .............. *H04L 5/0094* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 2013/0188530 A1* | 7/2013 | Pirskanen | H04W 72/0453 370/280 |
| 2016/0014778 A1* | 1/2016 | Zhou | H04L 5/0044 370/252 |
| 2019/0306861 A1* | 10/2019 | Li | H04L 5/0044 |
| 2020/0120642 A1 | 4/2020 | Hwang et al. | |

(Continued)

FOREIGN PATENT DOCUMENTS

WO WO-2021067703 A1 4/2021

OTHER PUBLICATIONS

Xingqin Lin, A Primer on Bandwidth Parts in 5G New Radio, 2020, p. 1-7.*

(Continued)

*Primary Examiner* — Alpus Hsu
*Assistant Examiner* — Camquyen Thai
(74) *Attorney, Agent, or Firm* — Holland & Hart LLP/Qualcomm Incorporated

(57) ABSTRACT

Methods, systems, and devices for wireless communications are described. A first wireless device such as a user equipment (UE) may receive a first message that indicates one or more resource allocation parameters associated with a bandwidth part (BWP). The one or more resource allocation parameters may include an indication of a first available resource block of the BWP, an indication of an effective size of the BWP, or both. The UE may then receive a second message that indicates a resource allocation for communicating with a network entity via the BWP during a transmission time interval (TTI). The UE may then communicate with the network entity during the transmission time interval in accordance with the resource allocation and based on applying the one or more resource allocation parameters.

19 Claims, 18 Drawing Sheets

(56) References Cited

U.S. PATENT DOCUMENTS

| | | | |
|---|---|---|---|
| 2020/0128577 A1* | 4/2020 | Shen | H04W 72/0453 |
| 2021/0152418 A1* | 5/2021 | Abdelghaffar | H04B 7/0602 |
| 2021/0204288 A1* | 7/2021 | Ji | H04W 72/0453 |
| 2022/0078803 A1 | 3/2022 | Yang et al. | |
| 2023/0318798 A1* | 10/2023 | Su | H04W 72/54 370/329 |
| 2024/0039655 A1* | 2/2024 | Rudolf | H04L 1/0003 |
| 2024/0098724 A1* | 3/2024 | Shi | H04L 5/0094 |

OTHER PUBLICATIONS

Huawei: "Summary of Email Discussion [100e-NR-L1enh_URLLC_PDCCH-01] on Remaining Issues on DCI Format", 3GPP TSG RAN WG1 Meeting #100-e, R1-2001404, 3GPP, Mobile Competence Centre, 650, Route Des Lucioles, F-06921 Sophia-Antipolis Cedex, FR, vol. RAN WG1, No. Feb, 24, 2020-Mar. 6, 2020, Mar. 6, 2020, 46 Pages, XP051860450, TP to TS 38.214, Sec. 5.1.2.2—Downlink resource allocation type 1 description completion 3.1.1.1.1, 5.1.2.2.2 Downlink resource allocation type 1, p. 17-p. 18.
International Search Report and Written Opinion—PCT/US2023/026583—ISA/EPO—Oct. 26, 2023.

* cited by examiner

ADAPTATION OF A FIRST AVAILABLE RESOURCE BLOCK AND RESOURCE BLOCK GROUP SIZE FOR FULL-DUPLEX COMMUNICATIONS

FIELD OF TECHNOLOGY

The following relates to wireless communications, including adaptation of a first available resource block and resource block group (RBG) size for full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Some communication devices may support half-duplex signaling, full-duplex signaling, or both. To support such half-duplex and full-duplex signaling, corresponding resource allocations for communicating within a slot may be defined.

SUMMARY

The described techniques relate to improved methods, systems, devices, and apparatuses that support adaptation of a first available resource block and resource block group (RBG) size for full-duplex communications. For example, the described techniques support methods for defining or updating how a device identifies a first available resource block and an effective size of a bandwidth part (BWP) for full-duplex communications (e.g., associated with sub-band full-duplex implementations). For example, a BWP at least partially overlaps with multiple uplink and downlink sub-bands of a full-duplex slot, which may cause ambiguity as to which resources are available for frequency resource allocation (FDRA), which relies on knowledge of both the first resource block and the size of the BWP. In cases that the BWP overlaps with multiple uplink and downlink sub-bands within the full-duplex slot, a user equipment (UE) may receive signaling which includes a quantity of resource allocation parameters and a corresponding resource allocation for communicating with a network entity in a full-duplex slot. For example, one resource allocation parameter may indicate that the device may consider the first available resource block as the first resource block that is completely contained in the first uplink sub-band that overlaps with the BWP. In some other examples, a resource allocation parameter may indicate an effective size of the BWP. For example, rather than using the total size of the BWP which overlaps with multiple uplink and downlink sub-bands within the full-duplex slot, the device may consider the portion of the BWP that overlaps with the uplink sub-band(s) as the effective size of the BWP. The first resource block and effective size of the BWP may then be used for FDRA and to indicate the resource allocation for communications within the full-duplex slot.

A method for wireless communication at a UE is described. The method may include receiving a first message indicating one or more resource allocation parameters associated with a BWP, the one or more resource allocation parameters including an indication of a first available resource block of the BWP, an indication of an effective size of the BWP, or both, receiving second message indicating a resource allocation for communicating with a network entity via the BWP during a transmission time interval (TTI) based on an application of the one or more resource allocation parameters, and communicating with the network entity during the TTI in accordance with the resource allocation.

An apparatus for wireless communication is described. The apparatus may include a memory, a transceiver, and at least one processor of a UE, the at least one processor coupled with the memory and the transceiver. The at least one processor may be configured to receive a first message indicating one or more resource allocation parameters associated with a BWP, the one or more resource allocation parameters including an indication of a first available resource block of the BWP, an indication of an effective size of the BWP, or both, receive second message indicating a resource allocation for communicating with a network entity via the BWP during a TTI based on an application of the one or more resource allocation parameters, and communicate with the network entity during the TTI in accordance with the resource allocation.

Another apparatus for wireless communication at a UE is described. The apparatus may include means for receiving a first message indicating one or more resource allocation parameters associated with a BWP, the one or more resource allocation parameters including an indication of a first available resource block of the BWP, an indication of an effective size of the BWP, or both, means for receiving second message indicating a resource allocation for communicating with a network entity via the BWP during a TTI based on an application of the one or more resource allocation parameters, and means for communicating with the network entity during the TTI in accordance with the resource allocation.

A non-transitory computer-readable medium storing code for wireless communication at a UE is described. The code may include instructions executable by a processor to receive a first message indicating one or more resource allocation parameters associated with a BWP, the one or more resource allocation parameters including an indication of a first available resource block of the BWP, an indication of an effective size of the BWP, or both, receive second message indicating a resource allocation for communicating with a network entity via the BWP during a TTI based on an application of the one or more resource allocation parameters, and communicate with the network entity during the TTI in accordance with the resource allocation.

In some examples of the method, apparatuses, and non-transitory computer-readable medium described herein, the TTI may be configured for half-duplex communications and the method, apparatuses, and non-transitory computer-readable medium may include further operations, features, means, or instructions for determining, based on the one or more resource allocation parameters, that the first available resource block of the BWP includes a first PRB of the BWP, where communicating with the network entity includes and communicating with the network entity during the TTI in accordance with the resource allocation, where the second message indicates a start and length indicator value (SLIV) that may be based on the first available resource block.

In some examples of the method, apparatuses, and non-transitory computer-readable medium described herein, the TTI may be configured for full-duplex communications and the method, apparatuses, and non-transitory computer-readable medium may include further operations, features, means, or instructions for determining, based on the one or more resource allocation parameters, that the first available resource block of the BWP includes a first PRB of the BWP that at least partially overlaps with a sub-band corresponding to the TTI, where communicating with the network entity includes and communicating with the network entity during the TTI in accordance with the resource allocation, where the second message indicates a SLIV based on the first available resource block.

In some examples of the method, apparatuses, and non-transitory computer-readable medium described herein, the BWP includes a subset of the sub-band of the TTI.

In some examples of the method, apparatuses, and non-transitory computer-readable medium described herein, the TTI may be configured for full-duplex communications and the method, apparatuses, and non-transitory computer-readable medium may include further operations, features, means, or instructions for determining, based on the one or more resource allocation parameters, that the first available resource block of the BWP includes a first physical resource block (PRB) of the BWP that at least partially overlaps with a first sub-band of a set of sub-bands corresponding to the TTI, where communicating with the network entity includes and communicating with the network entity during the TTI in accordance with the resource allocation, where the resource allocation may be based on the first available resource block.

In some examples of the method, apparatuses, and non-transitory computer-readable medium described herein, the TTI may be configured for half-duplex communications and the method, apparatuses, and non-transitory computer-readable medium may include further operations, features, means, or instructions for determining, based on the one or more resource allocation parameters, that the effective size of the BWP includes a total size of the BWP, where communicating with the network entity includes and communicating with the network entity during the TTI in accordance with the resource allocation, where the resource allocation may be based on the effective size of the BWP.

In some examples of the method, apparatuses, and non-transitory computer-readable medium described herein, the TTI may be configured for full-duplex communications and the method, apparatuses, and non-transitory computer-readable medium may include further operations, features, means, or instructions for determining, based on the one or more resource allocation parameters, that the BWP at least partially overlaps with a sub-band of the TTI and the effective size of the BWP includes a subset of a total size of BWP that overlaps with the sub-band, where communicating with the network entity includes and communicating with the network entity during the TTI in accordance with the resource allocation, where the resource allocation may be based on the effective size of the BWP.

In some examples of the method, apparatuses, and non-transitory computer-readable medium described herein, receiving the second message may include operations, features, means, or instructions for receiving the second message indicating the resource allocation as a bitmap indicating a quantity of resource block groups to use for communicating with the network entity, where each bit of the bitmap corresponds to a subset of the quantity of resource blocks based on the effective size of the BWP.

In some examples of the method, apparatuses, and non-transitory computer-readable medium described herein, the resource allocation includes a first resource allocation type corresponding to the indication of the effective size of the BWP.

In some examples of the method, apparatuses, and non-transitory computer-readable medium described herein, the resource allocation includes a second resource allocation type corresponding to the indication of the first available resource block of the BWP.

In some examples of the method, apparatuses, and non-transitory computer-readable medium described herein, the TTI may be configured for at least one of half duplex communications, in-band full duplex communications, or sub-band full duplex communications.

In some examples of the method, apparatuses, and non-transitory computer-readable medium described herein, the BWP includes an uplink BWP or a downlink BWP.

A method for wireless communication at a network entity is described. The method may include transmitting, to a UE a first message indicating one or more resource allocation parameters associated with a BWP, the one or more resource allocation parameters including an indication of a first available resource block of the BWP, an indication of an effective size of the BWP, or both, transmitting a second message indicating a resource allocation for communicating with the UE via the BWP during a TTI based on an application of the one or more resource allocation parameters, and communicating with the UE during the TTI in accordance with the resource allocation.

An apparatus for wireless communication is described. The apparatus may include a memory and at least one processor of a network entity, the at least one processor coupled with the memory. The at least one processor may be configured to transmit, to a UE a first message indicating one or more resource allocation parameters associated with a BWP, the one or more resource allocation parameters including an indication of a first available resource block of the BWP, an indication of an effective size of the BWP, or both, transmit a second message indicating a resource allocation for communicating with the UE via the BWP during a TTI based on an application of the one or more resource allocation parameters, and communicate with the UE during the TTI in accordance with the resource allocation.

Another apparatus for wireless communication at a network entity is described. The apparatus may include means for transmitting, to a UE a first message indicating one or more resource allocation parameters associated with a BWP, the one or more resource allocation parameters including an indication of a first available resource block of the BWP, an indication of an effective size of the BWP, or both, means for transmitting a second message indicating a resource allocation for communicating with the UE via the BWP during a TTI based on an application of the one or more resource allocation parameters, and means for communicating with the UE during the TTI in accordance with the resource allocation.

A non-transitory computer-readable medium storing code for wireless communication at a network entity is described. The code may include instructions executable by a processor to transmit, to a UE a first message indicating one or more resource allocation parameters associated with a BWP, the one or more resource allocation parameters including an indication of a first available resource block of the BWP, an indication of an effective size of the BWP, or both, transmit a second message indicating a resource allocation for communicating with the UE via the BWP during a TTI based on an application of the one or more resource allocation parameters, and communicate with the UE during the TTI in accordance with the resource allocation.

In some examples of the method, apparatuses, and non-transitory computer-readable medium described herein, the TTI may be configured for half-duplex communications and the method, apparatuses, and non-transitory computer-readable medium may include further operations, features, means, or instructions for allocating, in accordance with the one or more resource allocation parameters, the first available resource block of the BWP as a first PRB of the BWP, where communicating with the UE includes and communicating with the UE during the TTI in accordance with the resource allocation, where the second message indicates a SLIV that may be based on the first available resource block.

In some examples of the method, apparatuses, and non-transitory computer-readable medium described herein, the TTI may be configured for full-duplex communications and the method, apparatuses, and non-transitory computer-readable medium may include further operations, features, means, or instructions for allocating, in accordance with the one or more resource allocation parameters, the first available resource block of the BWP as a first PRB of the BWP that at least partially overlaps with a sub-band of the TTI, where communicating with the UE includes and communicating with the UE during the TTI in accordance with the resource allocation, where the second message indicates a SLIV based on the first available resource block.

In some examples of the method, apparatuses, and non-transitory computer-readable medium described herein, the BWP includes a subset of the sub-band of the TTI.

In some examples of the method, apparatuses, and non-transitory computer-readable medium described herein, the TTI may be configured for full-duplex communications and the method, apparatuses, and non-transitory computer-readable medium may include further operations, features, means, or instructions for allocating, in accordance with the one or more resource allocation parameters, the first available resource block of the BWP as a first PRB of the BWP that at least partially overlaps with a first sub-band of a set of sub-bands of the TTI, where communicating with the UE includes and communicating with the UE during the TTI in accordance with the resource allocation, where the resource allocation may be based on the first available resource block.

In some examples of the method, apparatuses, and non-transitory computer-readable medium described herein, the TTI may be configured for half-duplex communications and the method, apparatuses, and non-transitory computer-readable medium may include further operations, features, means, or instructions for allocating, in accordance with the one or more resource allocation parameters, the effective size of the BWP includes a total size of the BWP in the TTI, where communicating with the UE includes and communicating with the UE during the TTI in accordance with the resource allocation, where the resource allocation may be based on the effective size of the BWP.

In some examples of the method, apparatuses, and non-transitory computer-readable medium described herein, the TTI may be configured for full-duplex communications and the method, apparatuses, and non-transitory computer-readable medium may include further operations, features, means, or instructions for allocating, in accordance with the one or more resource allocation parameters, the BWP at least partially overlaps with a sub-band of the TTI and the effective size of the BWP includes a subset of a total size of BWP that overlaps with the sub-band, where communicating with the network entity includes and communicating with the UE during the TTI in accordance with the resource allocation, where the resource allocation may be based on the effective size of the BWP.

In some examples of the method, apparatuses, and non-transitory computer-readable medium described herein, transmitting the second message may include operations, features, means, or instructions for transmitting the second message indicating the resource allocation as a bitmap indicating a quantity of resource block groups to use for communicating with the network entity, where each bit of the bitmap corresponds to a subset of the quantity of resource blocks based on the effective size of the BWP.

In some examples of the method, apparatuses, and non-transitory computer-readable medium described herein, the resource allocation includes a first resource allocation type corresponding to the indication of the effective size of the BWP.

In some examples of the method, apparatuses, and non-transitory computer-readable medium described herein, the resource allocation includes a second resource allocation type corresponding to the indication of the first available resource block of the BWP.

In some examples of the method, apparatuses, and non-transitory computer-readable medium described herein, the TTI may be configured for at least one of half duplex communications, in-band full duplex communications, or sub-band full duplex communications.

In some examples of the method, apparatuses, and non-transitory computer-readable medium described herein, the BWP includes an uplink BWP or a downlink BWP.

DETAILED DESCRIPTION

Figure 1:
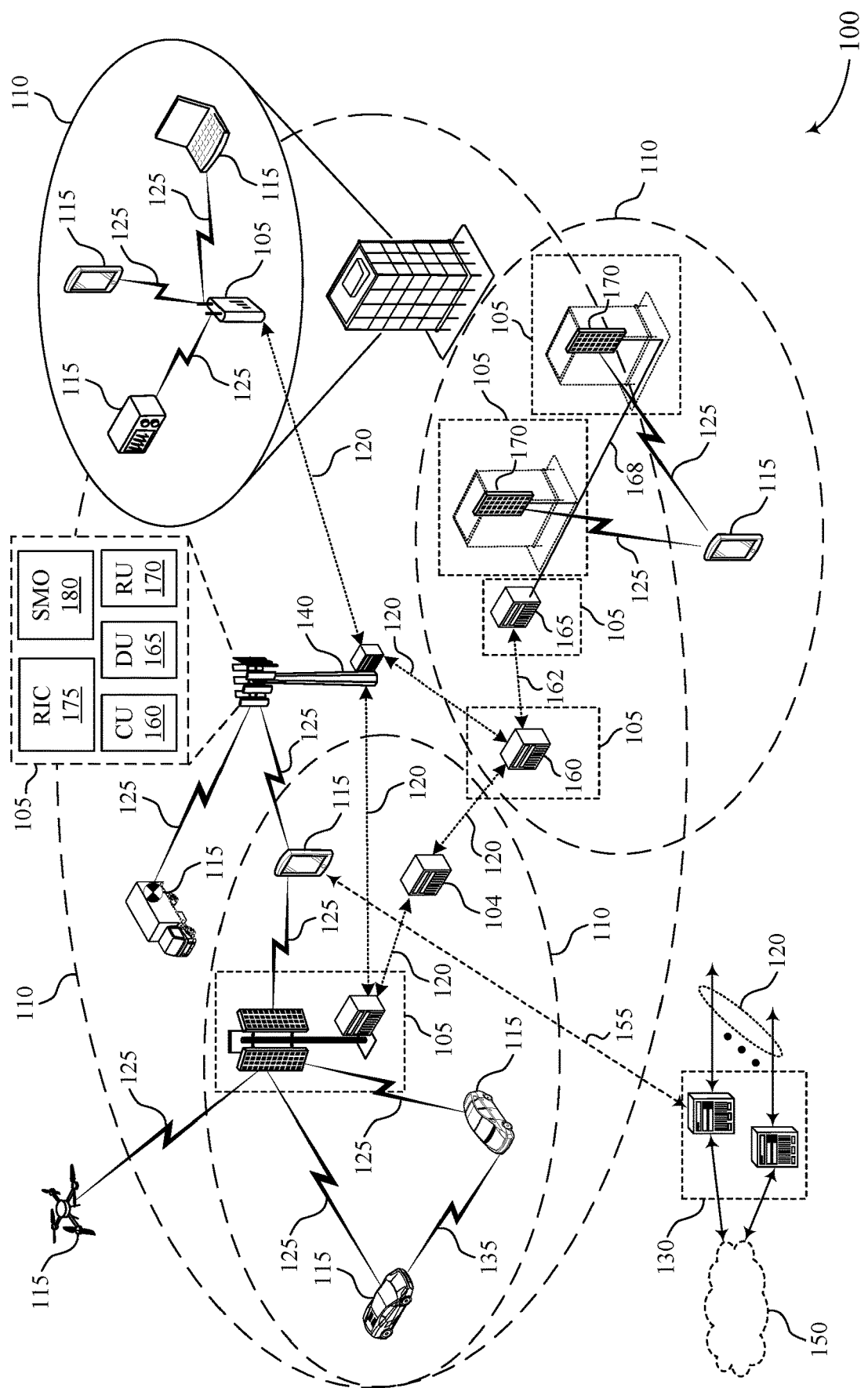
FIGS. 1 through 4 illustrate examples of wireless communications systems that support adaptation of a first available resource block and resource block group (RBG) size for full-duplex communications in accordance with one or more aspects of the present disclosure.

Some wireless communication systems may support a combination of full-duplex or half-duplex signaling between wireless devices. For example, a wireless device that operates in a half-duplex mode may either receive or transmit communications during a time and frequency resource, while a wireless device that operates in a full-duplex mode may transmit and receive concurrently within the same time and frequency resource. To support devices that operate using both half-duplex and full-duplex modes, and to improve scheduling efficiency, the network may frequently switch between allocating both full-duplex and half-duplex slots.

In some cases, the network may support a sub-band full-duplex configuration within a full-duplex slot, such that both uplink and downlink sub-bands are included in a same time resource, but on different frequency resources within the slot. The network may then allocate a quantity of resources within the slot based on information (e.g., first available resource block, effective bandwidth part (BWP) size, or both) associated with a configured BWP located in each slot. For example, using frequency domain resource allocation (FDRA), the network may support disjoint resource block allocation based on a total size of the BWP, or consecutive resource block allocation based on the first available resource block within the BWP.

In some implementations, however, the BWP size may be larger than the sub-band size (e.g., the BWP size may span more than one full uplink or downlink sub-band), which may cause ambiguity as to which resources are available for allocation within the BWP. For example, the network may allocate a quantity of uplink resources within the BWP, but the BWP may overlap with both uplink and downlink sub-bands, meaning that the effective size of the BWP is limited to the uplink resources overlapping with the BWP. Similarly, a starting resource block of the BWP may be located in a downlink sub-band that is unavailable for uplink resource allocation. The network relies on knowledge of the BWP size and the first available resource block within a BWP for the FDRA, but based on the overlap of the BWP with multiple sub-bands, the network may obtain more granular knowledge of which resources within the BWP are actually available to be allocated for uplink or downlink communications.

To support accurate resource allocation, a wireless device such as a UE may receive an FDRA to determine which resources are available to use within a BWP for uplink communications within a full-duplex slot. In some examples, the network may utilize a first resource allocation type (resource allocation type 0) which includes disjoint resource block allocation and relies on the size of the BWP to indicate the total RBG size. In some other examples, the network may utilize a second resource allocation type (resource allocation type 1), which may rely on the first available resource block to indicate a SLIV for allocating consecutive resource blocks within the BWP.

The network may determine an effective size of the BWP and an effective starting resource block to more accurately allocate resources within the BWP. In some examples, this effective size of the BWP may be different from the total BWP size, and the effective starting resource block may be different from the actual first resource block of the BWP. For example, for half-duplex slots, the effective BWP size may be the same as the BWP size. For the full-duplex slots, however, the effective BWP size may be the quantity of RBs that overlap with the transmission (e.g., uplink, downlink) sub-band. Similarly, in a half-duplex slot, the first resource block in a BWP may be the first physical resource block in the BWP. In the full-duplex slot, however, where the BWP overlaps with multiple uplink and downlink sub-bands, the first available resource block may be the first physical resource block in the BWP that overlaps with the transmission (e.g., uplink, downlink) sub-band. In some other cases, the BWP may be a subset of the transmission BWP, and thus, the first available resource block may be the first physical resource block in the BWP.

The network may use the effective size of the BWP and the effective first resource block within the BWP to efficiently allocate resources for communications with the UE during the transmission time interval while reducing inaccuracies related to sub-band overlap with the BWP within a full-duplex slot.

Aspects of the disclosure are initially described in the context of wireless communications systems. Aspects of the disclosure are further illustrated by and described with reference to apparatus diagrams, system diagrams, slot duplexing configurations, a process flow, and flowcharts that relate to adaptation of a first available resource block and resource block group (RBG) size for full-duplex communications.

FIG. 1 illustrates an example of a wireless communications system 100 that supports adaptation of a first available resource block and RBG size for full-duplex communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a mid-haul communication link 162 (e.g., in accordance with a mid-haul interface protocol) or a fronthaul communication link 168 (e.g., in accordance with a fronthaul interface protocol), or any combination thereof. The backhaul communication links 120, mid-haul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a mid-haul communication link 162 (e.g., F1, F1-c, F1-u), and a DU 165 may be connected to one or more RUs 170 via a fronthaul communication link 168 (e.g., open fronthaul (FH) interface). In some examples, a mid-haul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support adaptation of a first available resource block and RBG size for full-duplex communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support a combination of full-duplex and half-duplex signaling between wireless devices. For example, a wireless device (e.g., a UE 115, a network entity 105) that operates in a half-duplex mode may either receive or transmit communications during a time and frequency resource, while a wireless device that operates in a full-duplex mode may transmit and receive concurrently within the same time and frequency resource. In some cases, the wireless communications system 100 may support a sub-band full-duplex configuration within a full-duplex slot, such that both uplink and downlink sub-bands are included in a same time resource, but on different frequency resources within the slot. A network entity may then allocate a quantity of resources within the slot based on information associated with a configured BWP located in each slot. For example, using an FDRA, the network may support disjoint resource block allocation based on a total size of the BWP, or consecutive resource block allocation based on the first available resource block within the BWP.

In some implementations, however, the BWP size may be larger than the sub-band size (e.g., the BWP size may span more than one full uplink or downlink sub-band). For example, the network entity 105 may allocate a quantity of uplink resources within the BWP, but the BWP may overlap with both uplink and downlink sub-bands, meaning that the effective size of the BWP is limited to the uplink resources it overlaps with. Similarly, a starting resource block of the BWP may be located in a downlink sub-band that is unavailable for uplink resource allocation. Because the network entity relies on knowledge of the BWP size and the first available resource block within a BWP for the FDRA, the network entity may obtain more granular knowledge of which resources within the BWP are available to be allocated for uplink communications or downlink communications, or both.

The network may determine an effective size of the BWP and an effective starting resource block to more accurately allocate resources within the BWP. For example, for half-duplex slots, the effective BWP size may be the same as the BWP size. For the full-duplex slots, however, the effective BWP size may be the quantity of RBs that overlap with the transmission (e.g., uplink, downlink) sub-band. Similarly, in a half-duplex slot, the first resource block in a BWP may be the first physical resource block in the BWP. In the full-duplex slot, however, where the BWP overlaps with multiple uplink and downlink sub-bands, the first available resource block may be the first physical resource block in the BWP that overlaps with the transmission (e.g., uplink, downlink) sub-band. In some other cases, the BWP may be a subset of the transmission BWP, and thus, the first available resource block may be the first physical resource block in the BWP.

Figure 2:
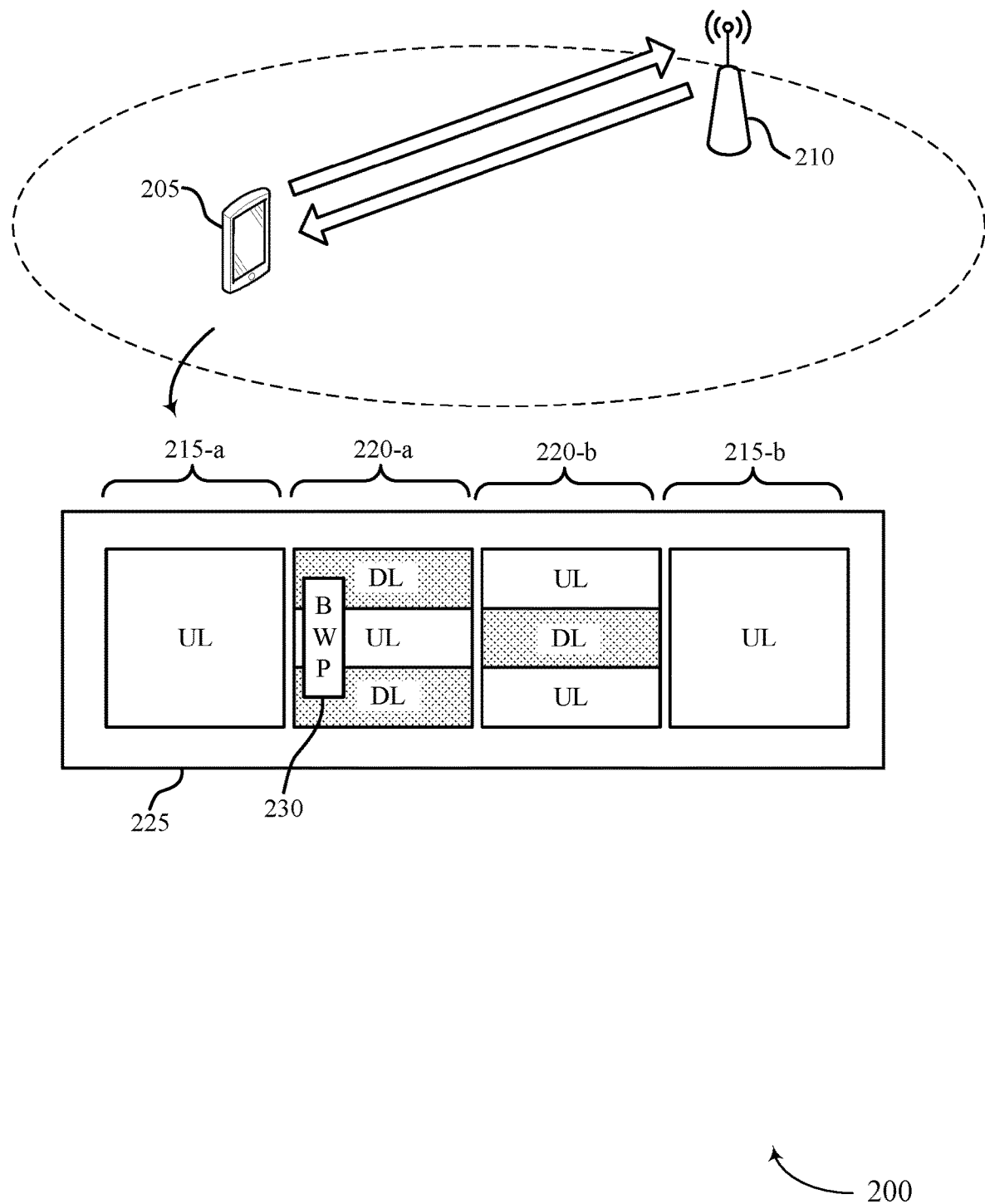

FIG. 2 illustrates an example of a wireless communications system 200 that supports adaptation of a first available resource block and RBG size for full-duplex communications in accordance with one or more aspects of the present disclosure. For example, wireless communications system 200 may support both half-duplex and full-duplex communications between devices such as a UE 205 and a network entity 210.

While operating in a half-duplex mode, a wireless device such as a UE 205 or network entity 210 may transmit or receive uplink information during one time interval, and may transmit or receive downlink information during a different time interval. In some other examples, while operating in a full-duplex mode, the UE 205 may transit uplink communications and receive downlink communications concurrently (e.g., at a same time and using a same time resource and different frequency resources). One example of such full-duplex operations may be in-band full-duplex (IBFD), which may allow transmitting and receiving terminals of the wireless device to transmit and receive simultaneously (e.g., at the same time and using the same time resource), and in the same frequency band. In such IBFD implementations, downlink and uplink communications may share the same IBFD time and frequency resource (e.g., the downlink and uplink resources may fully or partially overlap in time and frequency). Using IBFD, in some examples, may effectively increase (e.g., double) the spectrum utilization and throughout of the wireless system. A second example of full-duplex operations may be sub-band duplex communications (e.g., flexible duplex) where the wireless device may transmit and receive communications at the same time resource but on different frequency resources. In such examples, the downlink resource is separated from the uplink resource in the frequency domain via a guard band.

Some wireless networks may frequently switch between half-duplex configured slots (e.g., 215-a and 215-b) and full-duplex configured slots 220-a and 220-b of the resource allocation 225. For example, some full-duplex slots (e.g., slots 220-a and 220-b) may include multiple uplink and downlink sub-bands which may at least partially overlap with an allocated BWP 230 that is larger than the sub-band size. Various attributes of the BWP 230 are used in frequency domain resource assignment (FDRA) for communications using the full-duplex slot. For example, a first allocation type (e.g., allocation type 0) may be implemented for disjoint resource block allocation, where the network uses a bitmap (e.g., having 9 or 18 bits) to allocate a quantity of RBGs for uplink or downlink communications within the full-duplex slot. In accordance with the resource allocation type 0, the RBG size allocated for communications is based on BWP size and the configuration type (e.g., rbg-Size; ENUMERATED {config1, config2}. For example, the RBG size P may be selected from a table such as table 1, shown below:

TABLE 1

| | Nominal RBG Size P | |
|---|---|---|
| BWP Size | Configuration 1 | Configuration 2 |
| 1-36 | 2 | 4 |
| 37-72 | 4 | 8 |
| 73-144 | 8 | 16 |
| 145-275 | 16 | 16 |

In some other examples, a second resource allocation type (e.g., allocation type 1) may be implemented to allocate a quantity of consecutive resource blocks for communications. Such resource allocations may be indicated by a first available resource block present in the BWP (e.g., RB_start) and the quantity of consecutive resource blocks that are combined in the resource indicator value (RIV) field. To determine the RIV, for example, a device may use the length of the allocated resource blocks ($L_{RBs}$), the size of the BWP ($N_{BWP}^{size}$), and the starting resource block ($RB_{start}$), such that:

if $(L_{RBs}-1) \leq \lfloor N_{BWP}^{size}/2 \rfloor$, then $RIV = N_{BWP}^{size}(L_{RBs}-1) + RB_{start}$, else $RIV = N_{BWP}^{size}(N_{BWP}^{size} - L_{RBs}+1) + (N_{BWP}^{size}-1-RB_{start})$.

In some examples, the RIV may include a start and length indicator value (SLIV) for consecutive resource allocation. The SLIV used for resource allocation may rely on the starting resource block of a physical resource block (PRB), but the starting resource block may not be available because it overlaps with the one or more sub-bands of the full-duplex slot. Further, if there is repetition between two different slot types (e.g., half-duplex and full-duplex), the first resource block may be counted differently to avoid falling in another sub-band not meant for transmission.

Additionally, or alternatively, in cases that the BWP 230 at least partially overlaps with multiple sub-bands, not all of the resources in the BWP may be available for resource allocation (e.g., if allocating resources for uplink communications, the portions of the BWP that overlap with a downlink sub-band within the slot may not be available for use, and vice versa). Also, with the change in duplexity of the slots (e.g., from half-duplex to full-duplex), changing the BWP size to increase the quantity of available resources may not be practical or efficient (e.g., due to increased signaling for indicating a BWP change).

The wireless communications system 200 may support a quantity of resource allocation techniques that consider the possible sub-band overlap of a BWP within a full-duplex slot. For example, such resource allocation techniques may re-define or update how the device determines the first available resource block within a BWP of a full-duplex slot, and similarly how the device determines an effective size of the BWP within the full-duplex slot and overall RBG size of the resource allocation.

For example, in cases that the BWP 230 overlaps with multiple uplink and downlink sub-bands within the full-duplex slot, the UE 205 may consider the first available resource block as the first resource block that is completely contained in the first uplink sub-band that overlaps with the BWP. The UE 205 may then use this first available resource block to determine an SLIV for allocating transmission resources within the full-duplex slot for a type 1 frequency domain resource allocation. In some other examples, the device may determine an effective size of the BWP for type 0 frequency domain resource allocation. For example, rather than using the total size of the BWP 230 which overlaps with the multiple uplink and downlink sub-bands within the full-duplex slot, the UE 205 may consider only the portion of the BWP that overlaps with the uplink sub-band as the effective size of the BWP. The UE 205 may then use this effective size of the BWP to allocate resource blocks for transmission.

Figure 3:
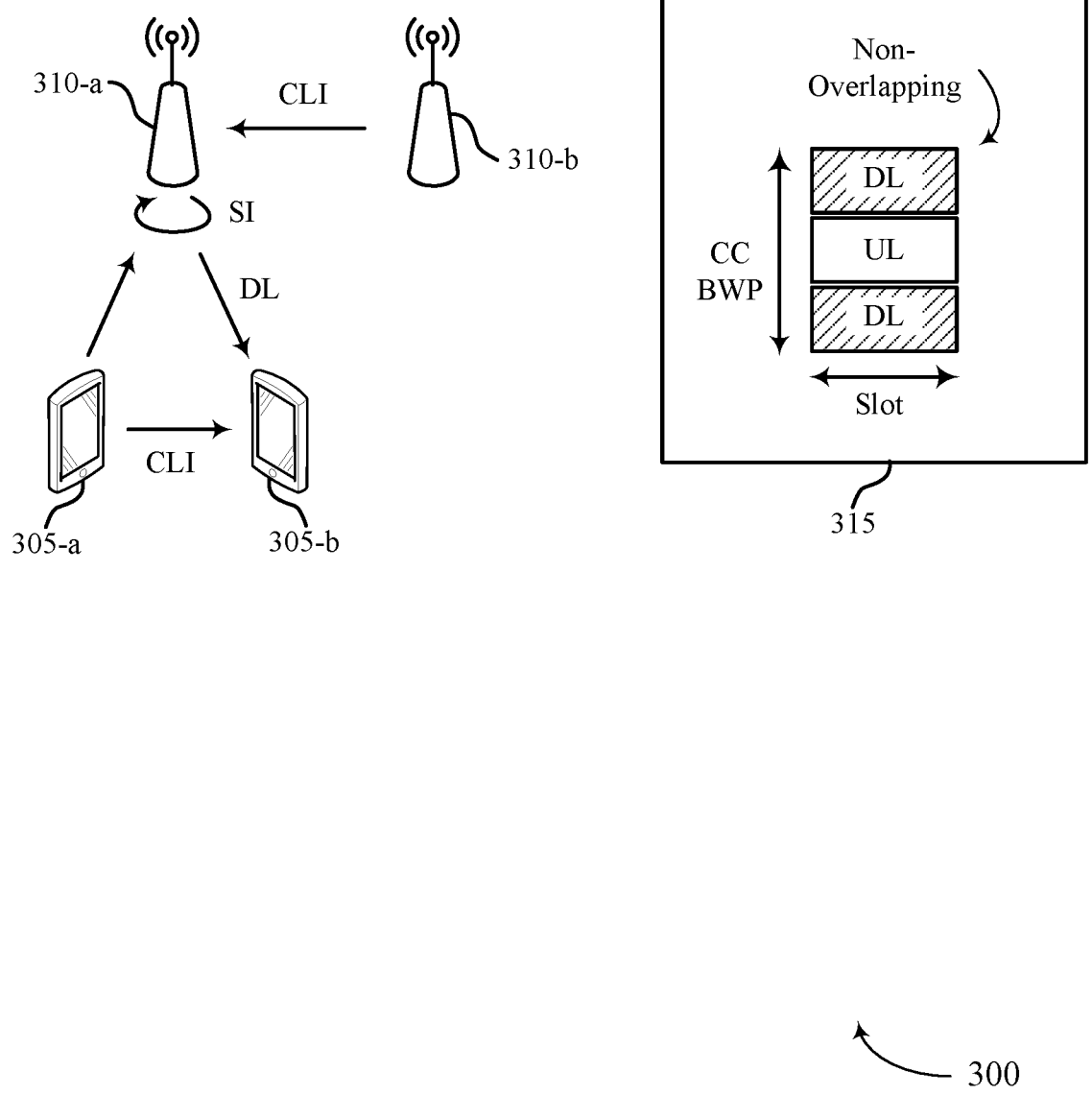

FIG. 3 illustrates an example of a wireless communications system 300 that supports adaptation of a first available resource block and RBG size for full-duplex communications in accordance with one or more aspects of the present disclosure. For example, wireless communications system 300 may support full-duplex communications at network entity 310-a, and half-duplex communications at UEs 305-a and 305-b. For example, the network entity 310-a or 310-b may support or otherwise be configured to receive or otherwise obtain an uplink (UL) transmission from UE 305-a or UE 305-b, and at the same time, perform a downlink (DL) transmission the UE 305-a, the UE 305-b, or both. In some examples, the network entity 310-a may perform a downlink transmission to UE 305-a, which may be a neighboring UE with respect to UE 305-b (e.g., at the same time or at a different time as performing the downlink transmission to UE 305-b).

In some examples, the full-duplex communications may include sub-band full-duplex (SBFD) (also referred to as "flexible duplex") where the same time resources (e.g., within a slot) are used, but different frequency resources (e.g., within the BWP (BW) of a CC) are used for the communications. For example, the downlink and uplink communications may share the same time resources (e.g., the communications may be performed at the same time, at least to some degree), and the uplink communications may use different frequency resources than the downlink communications. One example of such SBFD may include non-overlapping configuration 315 where the uplink and downlink communications are performed at the same time, but using different frequency resources. In some aspects, the downlink resources (e.g., the frequency resources used for the downlink communications) may be separated from the uplink resources (e.g., the frequency resources used for the uplink communications) in the frequency domain (e.g., there may be a frequency gap between uplink frequency resources and downlink frequency resources). In some examples, the UEs 305-a and 305-b may experience cross-link interference (CLI) with one another, and the network entities 310-a and 310-b may also experience CLI with one another. Additionally, or alternatively, the full-duplex network entity 310-a may experience self-interference (SI) based on the uplink and downlink signaling performed simultaneously.

In some examples, the network entity 310-a may allocate a quantity of resources within 315-a based on information associated with a configured BWP that may be associated with the full-duplex slot. For example, using FDRA, the network may support disjoint resource block allocation based on a total size of the BWP, or consecutive resource block allocation based on the first available resource block within the BWP. For example, the network entity 310-a may use a quantity of downlink resources within the BWP to communicate with UEs 305-a and 305-b, but the BWP may overlap with both uplink and downlink sub-bands, meaning that the effective size of the BWP is limited to the downlink resources it overlaps with. Similarly, a starting resource block of the BWP may be located in an uplink sub-band that is unavailable for downlink resource allocation.

To determine which downlink resources are available for communication with the UEs 305-a and 305-b, the network entity 310-a may determine an effective size of the BWP and an effective starting resource block to more accurately allocate resources within the BWP. For example, the effective BWP size may be the quantity of RBs that overlap with the downlink sub-band. Additionally, or alternatively, the first available resource block may be the first physical resource block in the BWP that overlaps with the downlink sub-band.

Figure 4:
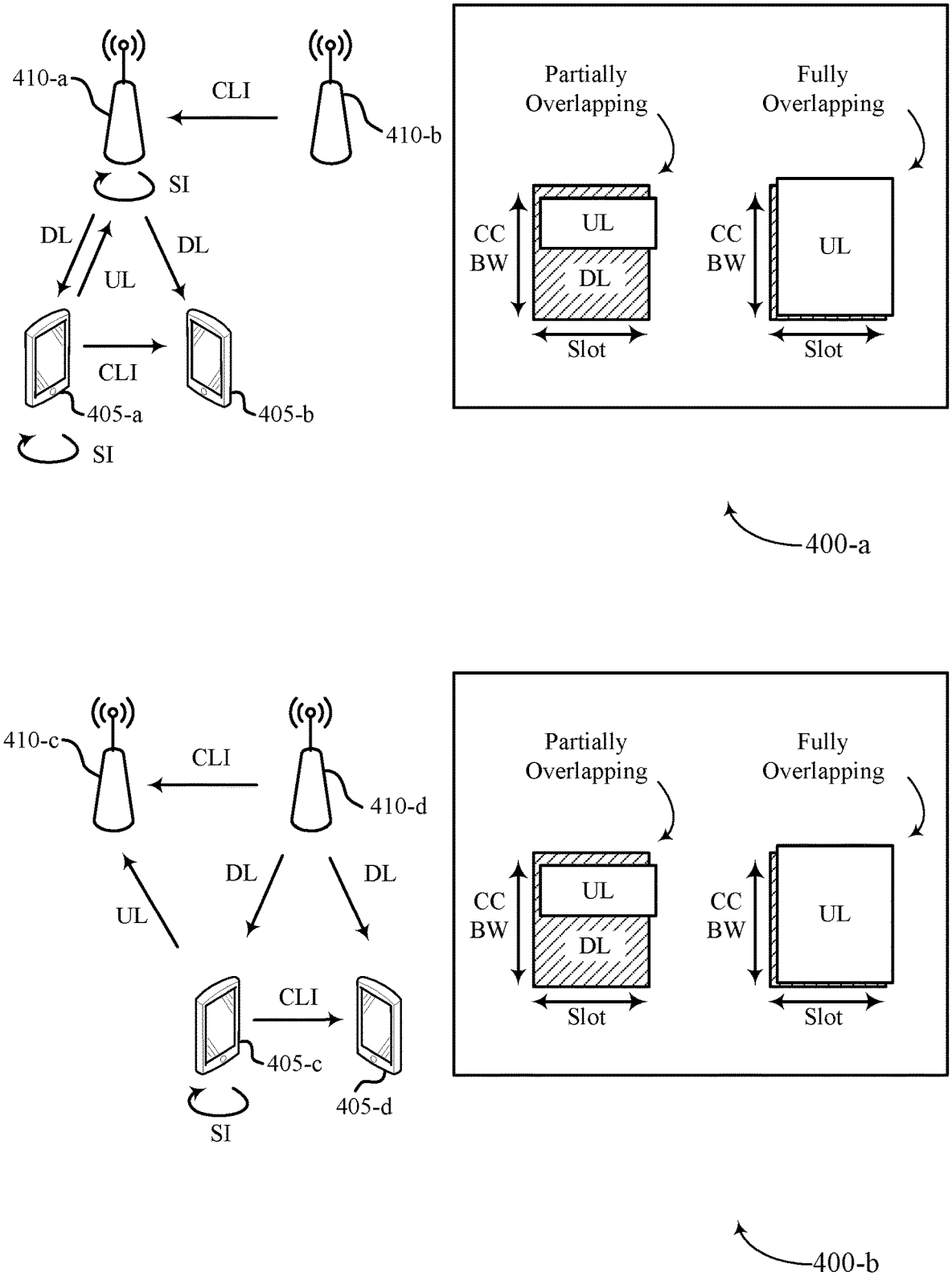

FIG. 4 illustrates an example of wireless communications systems 400-a and 400-b that support adaptation of a first available resource block and RBG size for full-duplex communications in accordance with one or more aspects of the present disclosure. For example, wireless communications system 400-a may support full-duplex communications at network entities 410-a and 410-b, as well as at UE 405-a, and half-duplex communications at UE 405-b. For example, the network entity 410-a or 410-b may support or otherwise be configured to receive or otherwise obtain an uplink (UL) transmission from UE 405-a or UE 405-b, and at the same time, perform a downlink (DL) transmission the UE 405-a, the UE 405-b, or both. In some examples, the network entity 410-a may perform a downlink transmission to UE 405-a, which may be a neighboring UE with respect to UE 405-b (e.g., at the same time or at a different time as performing the downlink transmission to UE 405-b).

Wireless communications system 400-b may support full-duplex communications at network entities 410-c and 410-d, as well as at UEs 405-c and 405-d. In some examples, the network entities 410-c and 410-d may be full-duplex-capable network entities, and UEs 405-c and 405-d may be SBFD-capable UEs. For example, the network entity 410-c or 410-d may support or otherwise be configured to receive or otherwise obtain an uplink (UL) transmission from UE 405-c or UE 405-d, and at the same time, perform a downlink (DL) transmission the UE 405-c, the UE 405-d, or both. In some examples, the network entity 410-d may perform downlink transmissions to UEs 405-c and 405-d, while the UE 405-c transmits an uplink message to the network entity 410-c.

A slot format may generally be defined as a downlink-plus-uplink slot in which the band (e.g., frequency resources) is used for both uplink and downlink communications. The downlink and uplink communications may occur in overlapping bands (e.g., IBFD) or in adjacent bands (e.g., SBFD). In a given symbol of a downlink-plus-uplink slot, a UE supporting half-duplex communications may either perform an uplink transmission in the uplink frequency resources or receive a downlink transmission in the downlink frequency resources. In a given symbol of a downlink-plus-uplink slot, a UE supporting full-duplex communications may both perform an uplink transmission in the uplink frequency resources and/or receive a downlink transmission in the downlink frequency resources. A given downlink-plus-uplink slot may include downlink-only symbols, uplink-only symbols, or full-duplex symbols.

However, communications within any wireless communication system are generally associated with introducing interference into the network. That is, any device within wireless communications systems 400-a and 400-b performing a transmission introduces at least some degree of interference into the network (e.g., interference that may then impact and/or must then be mitigated by other devices within the network). Two non-limiting examples of such interference include CLI and SI.

CLI is broadly defined as interference caused by or otherwise introduced into the network by another device performing a wireless transmission. For example, inter-cell interference may be caused by or otherwise associated with CLI caused by other network entities. For example, network entity 410-a may introduce inter-cell interference from the perspective of network entity 410-b when network entity 410-a performs the downlink transmissions to UE 405-a and/or UE 405-b. Intra-cell CLI may generally be associated with interference from UEs within the same cell where inter-cell CLI may generally be associated with interference from UEs in adjacent cells. For example, UE 405-a may introduce CLI (e.g., intra-cell or inter-cell CLI) into the network from the perspective UE 405-b when performing the uplink transmission to network entity 410-a.

SI is broadly defined as interference caused to a device by that device performing full-duplex communications. That is, a device (such as UE 405-a) configured to or otherwise supporting performing full-duplex communications may include separate transmit and receive chains (including antenna(s)) enabling the device to perform a transmission while also receiving a different transmission. The transmission being performed introduces SI into the receive chain (e.g., including antenna(s)) being used to receive the transmission.

In some examples, the network entities 410 may allocate a quantity of resources based on information associated with a configured BWP that may be associated with the full-duplex slot. For example, the network may support disjoint resource block allocation based on a total size of the BWP, or consecutive resource block allocation based on the first available resource block within the BWP.

To determine which downlink resources are available for communication with the UEs 405-a and 405-b (and resources for the UEs 405 to use for communicating with the network entities 410), the network entity 410-a may determine an effective size of the BWP and an effective starting resource block to more accurately allocate resources within the BWP. In such cases, RBG size determination may be a function of the effective BWP size (e.g., instead of the RBG size being based on the BWP size).

Figure 5:
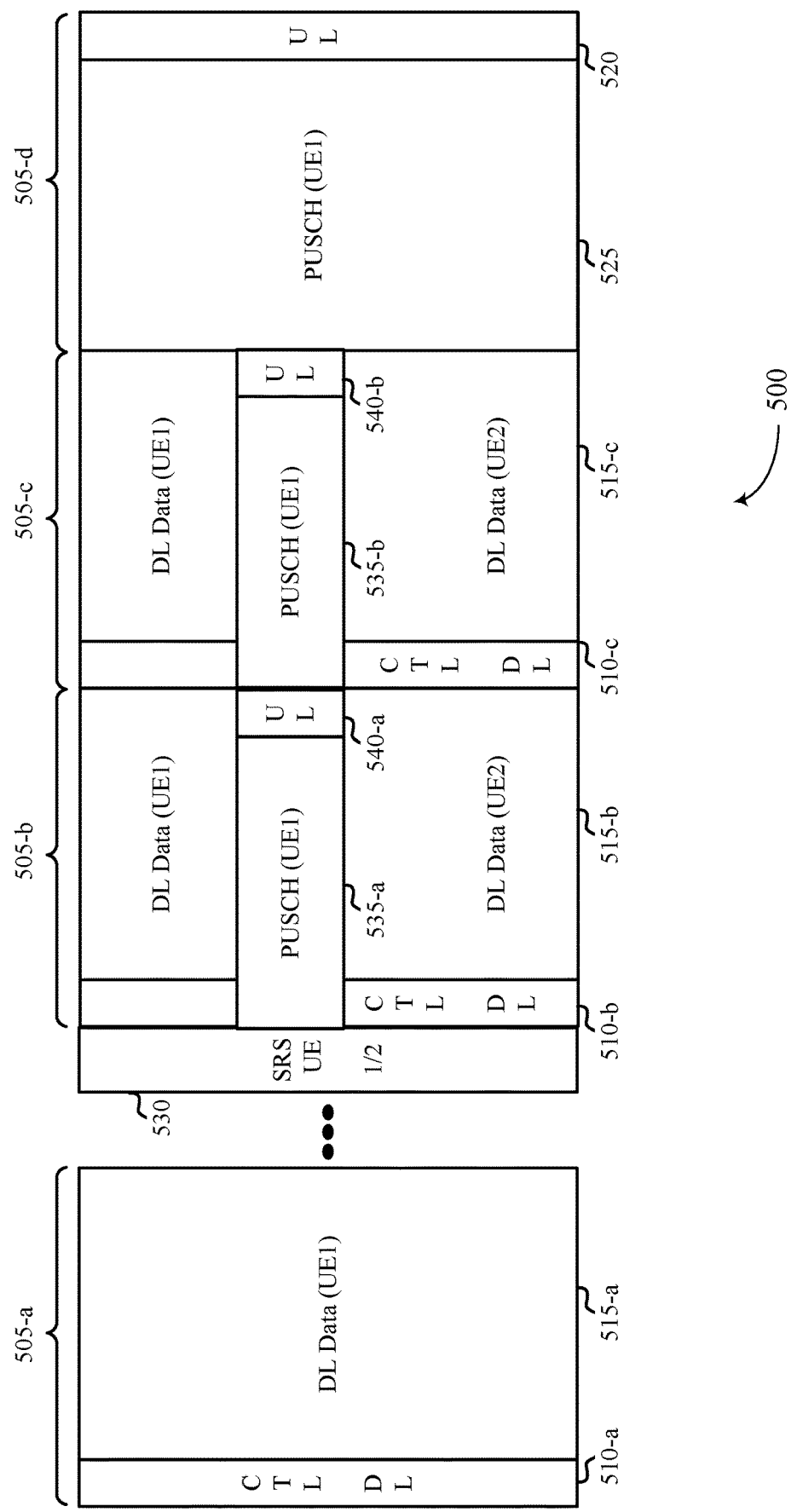
FIGS. 5 through 7 illustrate examples of slot duplexing configurations that support adaptation of a first available resource block and RBG size for full-duplex communications in accordance with one or more aspects of the present disclosure.

FIG. 5 illustrates an example of a slot duplexing configuration 500 that supports adaptation of a first available resource block and RBG size for full-duplex communications in accordance with one or more aspects of the present disclosure. Slot duplexing configuration 500 illustrates an example of duplexing operations that may be adopted in accordance with the techniques described herein. For example, a plurality of slots 505 may be available for communications between a UE and a network entity as described with reference to FIGS. 1-4. In some examples, the slot duplexing configuration 500 may be used to support the techniques for determining the first available resource block and the effective BWP size as described herein.

Each slot 505 may generally include a control (CTL) portion (e.g., a physical downlink control channel (PDCCH) used for communicating control information, such as downlink control information (DCI) communications) and a data portion (e.g., a physical downlink shared channel (PDSCH) used for communicating data). Slot 505-a provides an example of a downlink slot where the control portion 510-a comprises a downlink control portion (e.g., PDCCH) and data portion 515-a comprises a downlink data portion (e.g., PDSCH). For downlink slots 505, the control portion occurs at the beginning of the slot 505 (e.g., the first two or three symbols) while the data portion 515-a uses most or all of the remaining symbols in the slot (there may be one or more gap symbols within the data portion 515). Slot 505-d comprises an example of an uplink slot where the control portion 520 occurs in the last two or three symbols of the slot 505 and the data portion 525 occurs in the remaining symbols of the slot 505. Moreover, some slots 505 may include one or more portions 530 where UE (such as a first UE, UE1, and a second UE, UE2) perform sounding reference signal (SRS) transmissions to sound the channel.

In some examples, slot 505-b and slot 505-c illustrate examples of flexible duplexing (e.g., downlink-plus-uplink) slots. In particular, slot 505-b and slot 505-c illustrate examples of SBFD slots supporting full-duplex communications using uplink resources (e.g., PUSCH) as well as using downlink resources (e.g., PDSCH). For example, the time resources may overlap in the time domain in the SBFD scenario while the frequency resources used for downlink transmissions are different from the frequency resources used for uplink transmissions. In some examples, the downlink and uplink transmissions may occur in overlapping bands (e.g., IBFD) or adjacent bands (e.g., SBFD). In a given downlink-plus-uplink symbol, a UE configured for half-duplex communications may either transmit communications in the uplink band or receive in the downlink band. Additionally, or alternatively, a UE configured for full-duplex communications may transmit in the uplink band and/or receive in the downlink band in the same slot. In some cases, a downlink-plus-uplink slot may include downlink symbols, uplink symbols, or full-duplex symbols.

In some examples, slot 505-b including a first portion of downlink frequency resources allocated to downlink transmissions to the first UE (e.g., PDSCH for UE1) and a second portion of downlink frequency resources allocated to downlink transmissions to the second UE (e.g., PDSCH for UE2). Slot 505-b may include control portion 510-b and data portion 515-*b*. Slot 505-*b* may also include a set of uplink frequency resources, that may optionally include both a data portion 535-*a* (e.g., used for communicating uplink data) and a control portion 540-*a* (e.g., used for communicating scheduling requests (SR) transmissions, buffer status report (BSR) transmissions, uplink control information (UCI) transmissions, etc.).

In some other examples, the slot 505-*c* including a first portion of downlink frequency resources allocated to downlink transmissions to the first UE (e.g., PDSCH for UE1) and a second portion of downlink frequency resources allocated to downlink transmissions to the second UE (e.g., PDSCH for UE2). Slot 505-*c* may include a control portion 510-*c* and a data portion 515-*c*. Slot 505-*c* may also include a set of uplink frequency resources, that may optionally include both a data portion 535-*b* and a control portion 540-*b*.

Techniques described herein may define how a device determines the first available resource block within a BWP of a full-duplex slot (e.g., slot 505-*b*, slot 505-*c*), and similarly how a device determines an effective size of the BWP within the full-duplex slot. For example, in cases that the BWP overlaps with multiple uplink and downlink sub-bands within the full-duplex slot, the device may consider the first available resource block as the first resource block that is completely contained in the first uplink sub-band that overlaps with the bandwidth part. The device may then use this first available resource block to determine an SLIV for allocating transmission resources within the full-duplex slot, for example, for a type 1 frequency domain resource allocation. In some other examples, the device may determine an effective size of the BWP for type 0 frequency domain resource allocation. Here, rather than using a total size of the BWP which overlaps with multiple uplink and downlink sub-bands within a full-duplex slot, the device may consider only the portion of the BWP that overlaps with the uplink sub-band(s) or the downlink sub-band(s) as the effective size of the bandwidth part. The device may then use this effective size of the BWP to allocate resource blocks for transmission.

Figure 6:
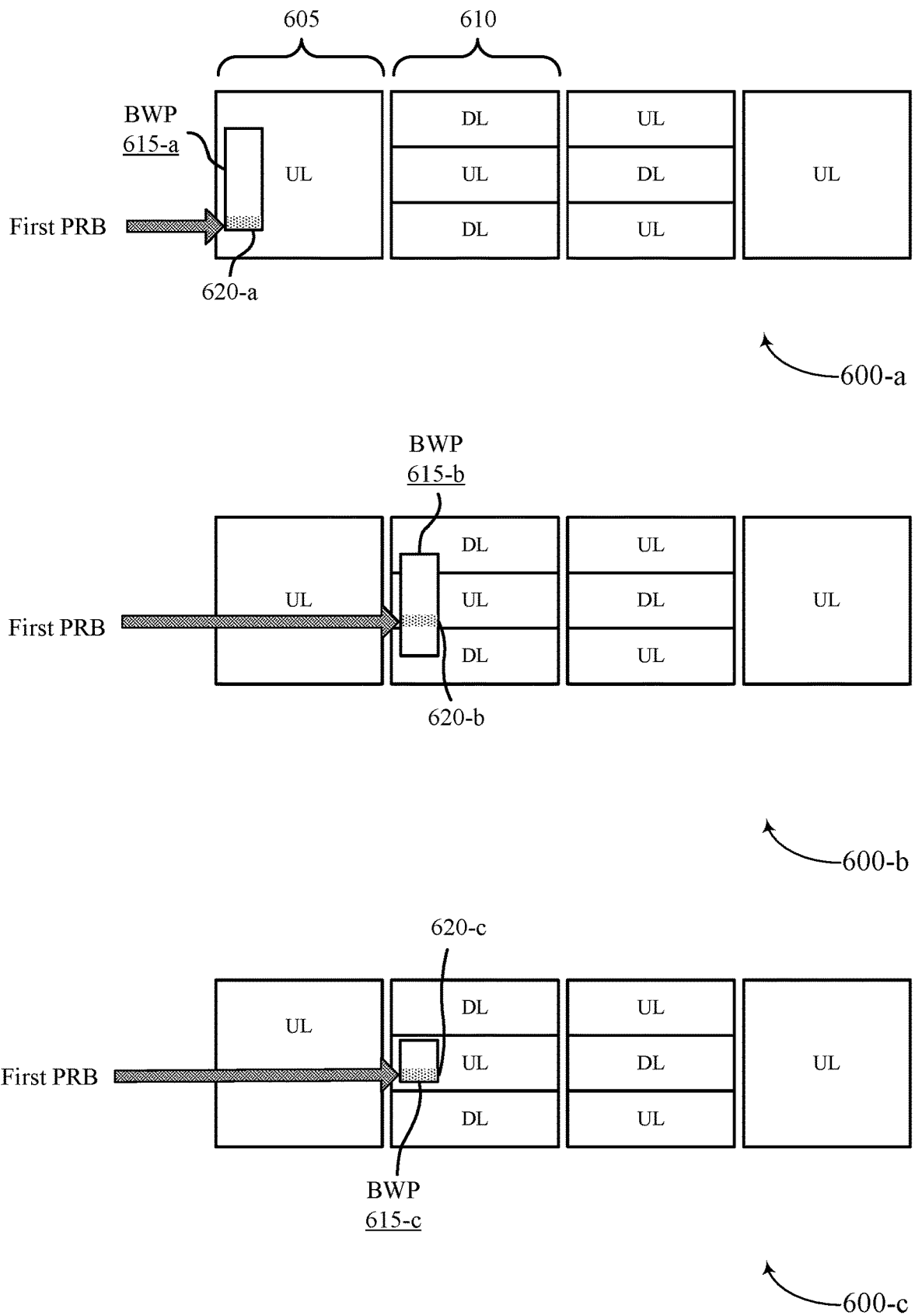

FIG. 6 illustrates an example of slot format configurations 600-*a*, 600-*b*, and 600-*c* that support adaptation of a first available resource block and RBG size for full-duplex communications in accordance with one or more aspects of the present disclosure. For example, slot format configurations 600-*a*, 600-*b*, and 600-*c* may illustrate an example of duplexing operations that may be adopted in accordance with the techniques described herein. For example, a plurality of slots may be available for communications between a UE and a network entity as described with reference to FIGS. 1-4.

In some wireless communications systems, a device may communicate via resources that relatively frequently switch between half-duplex and full-duplex communications and may be configured with a resource allocation including both half-duplex configured slots (e.g., slot 605 and the like) and full-duplex configured slots (e.g., slot 610 and the like). For example, some half-duplex slots, such as slot 605, may include either uplink resource or downlink resources within a BWP, while some full-duplex slots, such as slot 610, may include multiple uplink and downlink sub-bands which may at least partially overlap with an allocated BWP that is larger than the sub-band size. In some examples, a device such as a UE may determine an effective size of the BWP or the first PRB within the BWP in order to identify a resource allocation (e.g., resource allocation type 0 or resource allocation type 1) for communicating with a network device. In some examples, the UE may receive an indication of the effective size of the BWP or the first PRB of the BWP via control signaling (e.g., DCI, RRC, MAC-CE), from the network.

In a first slot format configuration 600-*a*, the BWP 615-*a* may be located within the half-duplex slot 605, and the first available PRB 620-*a* may be identified as the actual first resource block within the BWP 615-*a*. In addition, the effective size of the BWP 615-*a* within slot 605 of the slot format configuration 600-*a* may be the same as the actual size of the BWP 615-*a*.

In a second slot format configuration 600-*b*, the BWP 615-*b* may be located within a full-duplex slot that includes uplink and downlink sub-bands, if the transmission (e.g., UL) sub-band is a subset of the BWP 615-*b*, the first available PRB is the first PRB 620-*b* in the BWP 615-*b* that overlaps with the uplink sub-band. In addition, the effective size of the BWP 615-*c* within slot 605 of the slot format configuration 600-*a* may be the same as the actual size of the BWP 615-*c*. In addition, the effective size of the BWP 615-*b* within the full-duplex slot of the slot format configuration 600-*b* may be equal to the quantity of resource blocks that overlap with the transmission (e.g., uplink) sub-band.

In a third slot format configuration 600-*c*, the BWP 615-*c* may be located within the uplink sub-band (e.g., the BWP 615-*c* may be a subset of the transmission sub-band). In such examples, the first available PRB 620-*c* in the BWP 615-*c* may be the actual first PRB in the BWP 615-*c*. In addition, the effective size of the BWP 615-*c* within the full-duplex slot of the slot format configuration 600-*c* may be equal to the quantity of resource blocks that overlap with the transmission (e.g., uplink) sub-band, or in the example of the slot format configuration 600-*c*, equal to the total size of the BWP 615-*c*.

Based on the determined first available PRB, the UE may determine a RIV or a SLIV for allocating transmission resources within the slots for type 1 FDRA. In some examples, the UE may receive an indication of the first available PRB from the network. Additionally, or alternatively, the UE may determine the size of the RBG for communications based on the effective size of the BWP. In some examples, the UE may receive an indication of the RIV or SLIV via signaling from the network, and the UE may also in some cases receive an indication of the effective size of the BWP via signaling from the network.

Although the aspects provided with reference to FIG. 6 are described with reference to uplink transmissions (e.g., where the first available PRB may be determined based on which uplink sub-bands at least partially overlap with a BWP 615), it is understood that similar aspects are applicable to downlink communications and downlink sub-bands. For instance, a BWP 615 may be located within a half-duplex slot (e.g., a downlink slot), and the first available PRB 620 may be identified as the actual first resource block within the BWP 615. In addition, the effective size of the BWP 615 within the slot may be the same as the actual size of the BWP 615. In other examples, the BWP 615 may be located within a full-duplex slot that includes uplink and downlink sub-bands, if the transmission (e.g., DL) sub-band is a subset of the BWP 615, the first available PRB is the first PRB 620 in the BWP 615 that overlaps with the downlink sub-band.

Figure 7:
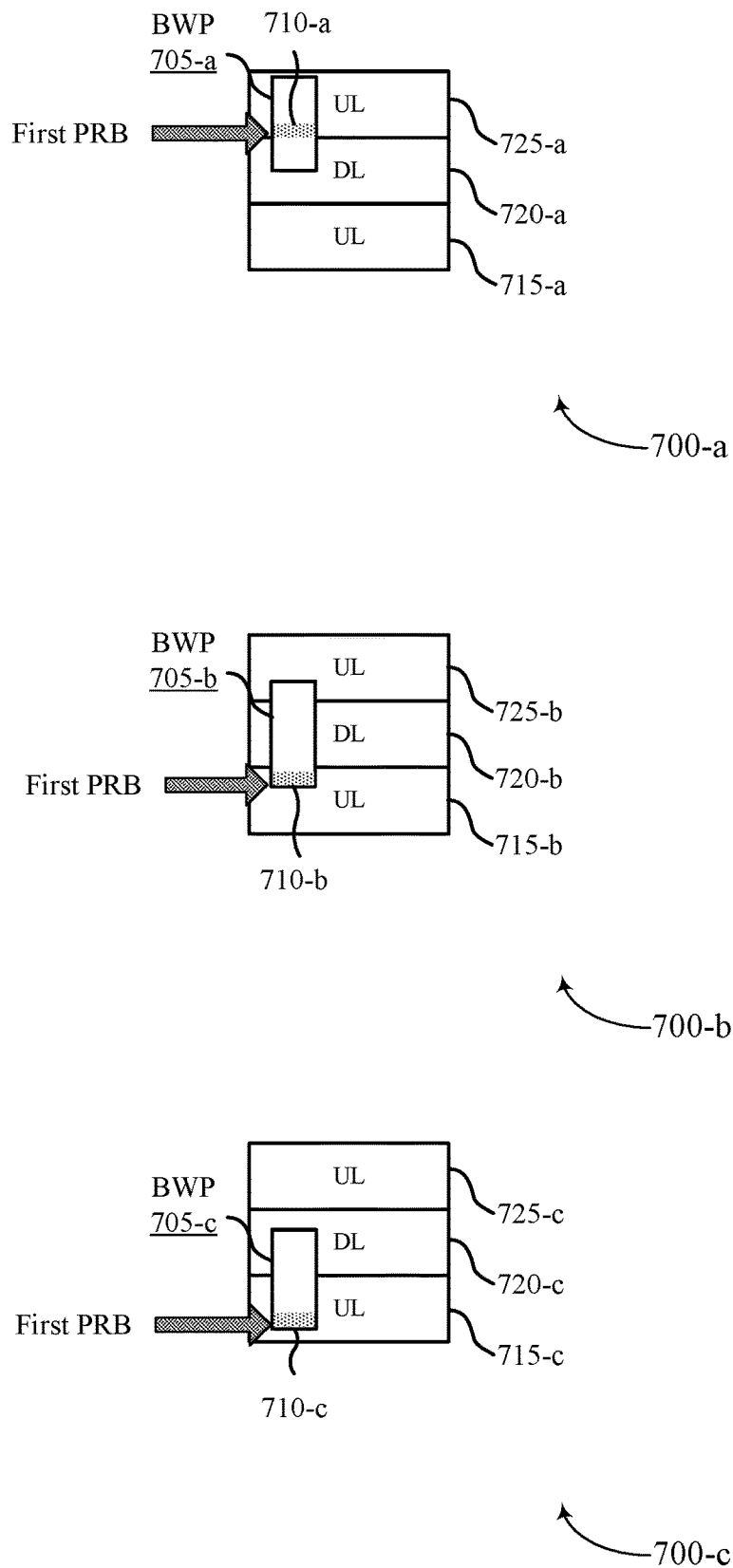

FIG. 7 illustrates an example of slot format configurations 700-*a*, 700-*b*, and 700-*c* that support adaptation of a first available resource block and RBG size for full-duplex communications in accordance with one or more aspects of the present disclosure. For example, slot format configurations 700-*a*, 700-*b*, and 700-*c* may illustrate an example of duplexing operations that may be adopted in accordance with the techniques described herein. For example, a plurality of slots may be available for communications between a UE and a network entity as described with reference to FIGS. 1-4.

Full-duplex slot format configurations 700-*a*, 700-*b*, and 700-*c* may support both uplink and downlink communications using uplink and downlink sub-bands allocated at different frequencies within the slot. In some examples, the uplink and downlink bands are disjoint, and a BWP (e.g., an uplink BWP, a downlink BWP) may overlap one or more sub-bands.

In a first slot format configuration 700-*a* that includes a first uplink sub-band 715-*a*, a downlink sub-band 720-*a*, and a second uplink sub-band 725-*b*, the BWP 705-*a* may at least partially overlap with the downlink sub-band 720-*a* and the second uplink sub-band 725-*a*. In such examples, the first available PRB 710-*a* may be identified as the first resource block located within the second uplink sub-band 725-*a*. In addition, the effective size of the BWP 705-*a* may be equal to the quantity of resource blocks located within the uplink sub-band 725-*a* overlapped by the BWP 705-*a*.

In a second slot format configuration 700-*b*, the BWP 705-*b* may be located within a full-duplex slot that includes uplink sub-bands 715-*b* and 725-*b*, and downlink sub-band 720-*b*. The BWP 705-*b* may overlap with the two uplink sub-bands 715-*b* and 725-*b* and may also overlap the single downlink sub-band 720-*b* (located between the two uplink sub-bands). In such cases, the first PRB 710-*b* of the BWP 705-*b* may be the first PRB located within the first uplink sub-band 715-*b*. In addition, the effective size of the BWP 705-*b* may be equal to the quantity of resource blocks that overlap with the transmission (UL) sub-bands 715-*b* and 725-*b*.

In a third slot format configuration 700-*c* that includes a first uplink sub-band 715-*c*, a downlink sub-band 720-*c*, and a second uplink sub-band 725-*c*, the BWP 705-*c* may at least partially overlap with a downlink sub-band 720-*c* and a first uplink sub-band 715-*c*. In such examples, the first available PRB 710-*c* may be identified as the first resource block located within the first uplink sub-band 715-*c*. In addition, the effective size of the BWP 705-*c* may be equal to the quantity of resource blocks located within the uplink sub-band 715-*c* overlapped by the BWP 705-*c*.

Although the aspects provided with reference to FIG. 7 are described with reference to uplink transmissions (e.g., where the first available PRB may be determined when sub-bands are disjoint and the BWP 705 overlaps with another sub-band), it is understood that similar aspects are applicable to downlink communications and downlink sub-bands. For instance, a slot may include a first downlink sub-band, an uplink sub-band, and a second downlink sub-band. A BWP 705 may at least partially overlap with the uplink sub-band and the first downlink sub-band. In such examples, the first available PRB 710 may be identified as the first resource block located within the first downlink sub-band. In addition, the effective size of the BWP 705 may be equal to the number of resource blocks located within the first downlink sub-band overlapped by the BWP 705.

Figure 8:
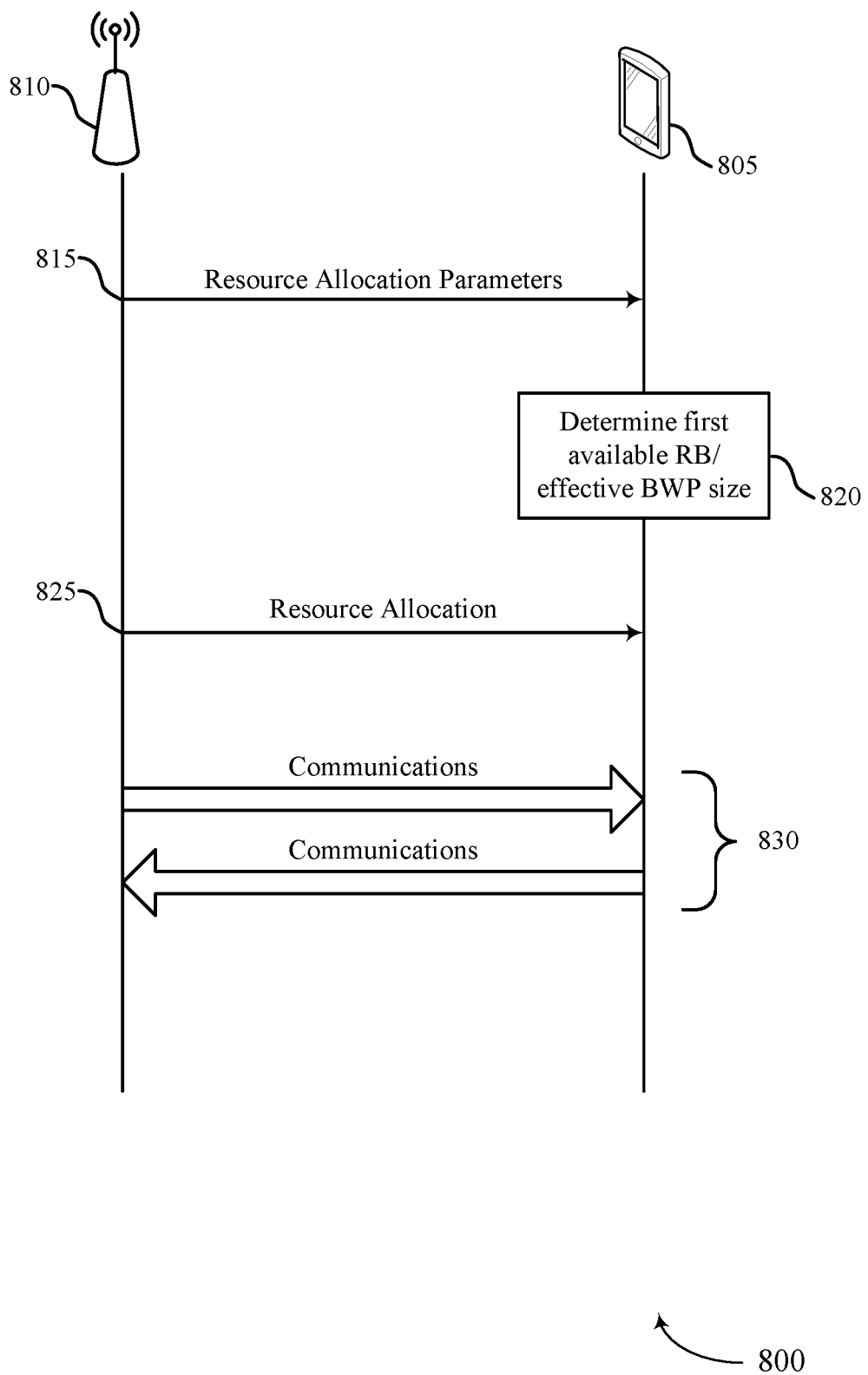
FIG. 8 illustrates an example of a process flow in a system that supports adaptation of a first available resource block and RBG size for full-duplex communications in accordance with one or more aspects of the present disclosure.

FIG. 8 illustrates an example of a process flow 800 that supports adaptation of a first available resource block and RBG size for full-duplex communications in accordance with one or more aspects of the present disclosure. For example, the process flow 800 illustrates communications between a first wireless device (e.g., a UE 805) and a second wireless device (e.g., a network entity 810). In the following description of the process flow 800, the operations between the first device and the second device may be communicated in a different order than the example order shown, or the operations performed by the first device and the second device may be performed in different orders or at different times. Some operations may also be omitted from the process flow 800, and other operations may be added to the process flow 800.

At 815, the UE 805 may receive a first message that indicates one or more resource allocation parameters associated with a BWP. The one or more resource allocation parameters may include an indication of a first available resource block of the BWP, an indication of an effective size of the BWP, or both.

At 820, the UE 805 may determine that the first available resource block of the BWP is a first physical resource block of the BWP. In some other examples, the UE 805 may determine that the first available resource block of the BWP comprises a first physical resource block of the BWP that at least partially overlaps with a sub-band corresponding to the TTI. In some examples, the BWP is a subset of the sub-band of the TTI.

In some examples, the UE 805 may determine that the effective size of the BWP as a total size of the BWP. In some other examples, the BWP at least partially overlaps with a sub-band of the TTI, and the effective size of the BWP is a subset of a total size of BWP that overlaps with the sub-band.

At 825, the UE 805 may receive a second message indicating a resource allocation for communicating with the network entity 810 via the BWP during a transmission time interval (TTI) based on application of the one or more resource allocation parameters. In some examples, the resource allocation includes a first resource allocation type corresponding to the effective of the BWP or a second resource allocation type corresponding to the indication of the first available resource block of the BWP. In some examples, the TTI may be configured for half-duplex communications or full-duplex communications (e.g., in-band full-duplex, sub-band full-duplex). In some examples, the second message may indicate the resource allocation as a bitmap indicating a quantity of RBGs to use for communicating with the network entity, where each bit of the bitmap corresponds to a subset of the quantity of resource blocks.

At 830, the UE 805 may communicate with the network entity during the TTI in accordance with the resource allocation. In some examples, the second message including the resource allocation indicates a SLIV that is based on the first available resource block.

At 815, the UE 805 may receive a first message that indicates one or more resource allocation parameters associated with a BWP. The one or more resource allocation parameters may include an indication of a first available resource block of the BWP, an indication of an effective size of the BWP, or both.

At 820, the UE 805 may determine that the first available resource block of the BWP is a first physical resource block of the BWP. In some other examples, the UE 805 may determine that the first available resource block of the BWP comprises a first physical resource block of the BWP that at least partially overlaps with a sub-band corresponding to the TTI. In some examples, the BWP is a subset of the sub-band of the TTI. In some examples, the UE 805 may determine that the effective size of the BWP as a total size of the BWP. In some other examples, the BWP at least partially overlaps with a sub-band of the TTI, and the effective size of the BWP is a subset of a total size of BWP that overlaps with the sub-band.

At 825, the UE 805 may receive a second message indicating a resource allocation for communicating with the network entity 810 via the BWP during a transmission time interval (TTI) based on application of the one or more resource allocation parameters. In some examples, the resource allocation includes a first resource allocation type corresponding to the effective of the BWP or a second resource allocation type corresponding to the indication of the first available resource block of the BWP. In some examples, the TTI may be configured for half-duplex communications or full-duplex communications (e.g., in-band full-duplex, sub-band full-duplex). In some examples, the second message may indicate the resource allocation as a bitmap indicating a quantity of RBGs to use for communicating with the network entity, where each bit of the bitmap corresponds to a subset of the quantity of resource blocks.

At 830, the UE 805 may communicate with the network entity during the TTI in accordance with the resource allocation. In some examples, the second message including the resource allocation indicates a SLIV that is based on the first available resource block.

Figure 9:
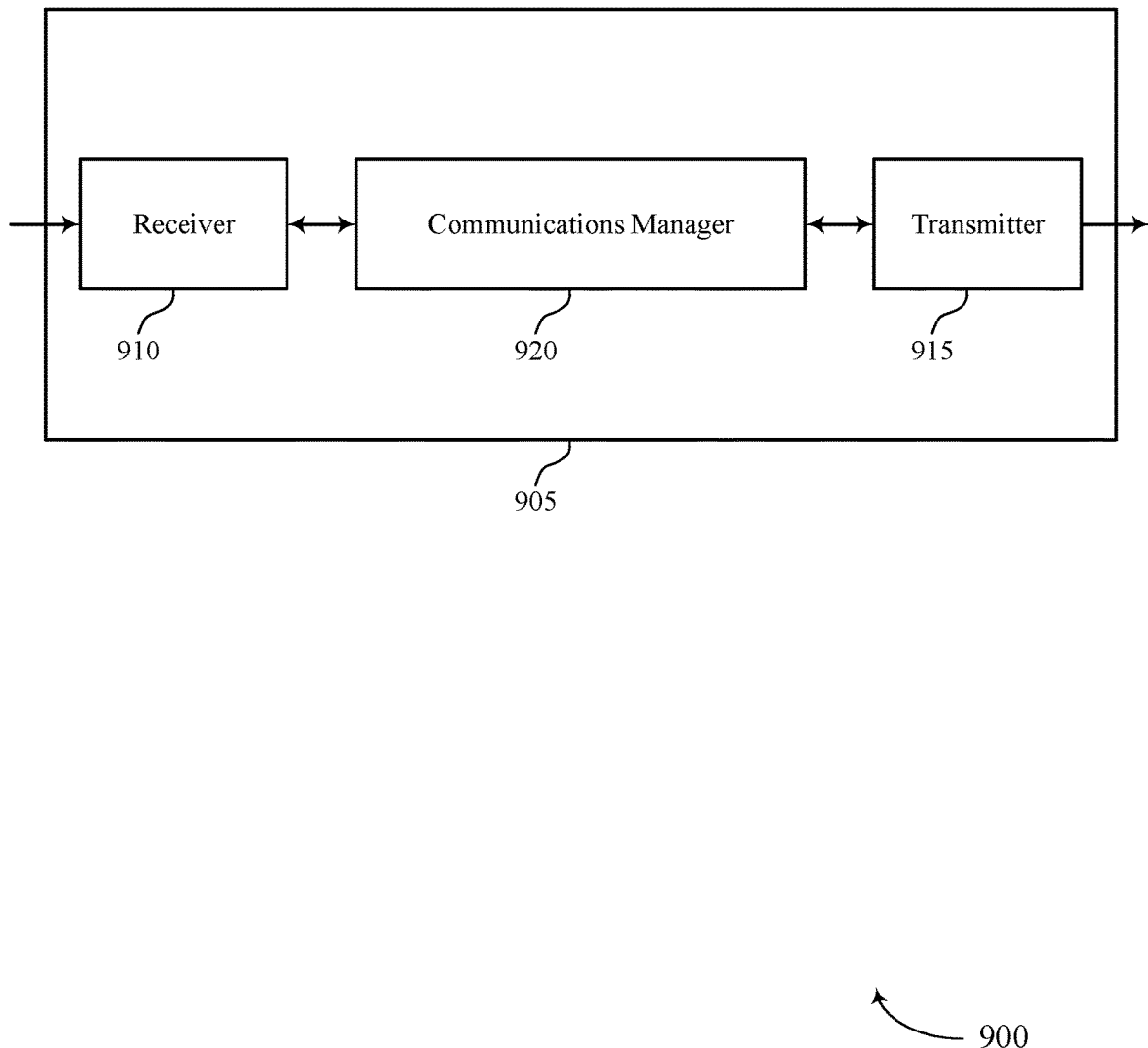
FIGS. 9 and 10 show block diagrams of devices that support adaptation of a first available resource block and RBG size for full-duplex communications in accordance with one or more aspects of the present disclosure.

FIG. 9 shows a block diagram 900 of a device 905 that supports adaptation of a first available resource block and RBG size for full-duplex communications in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to adaptation of a first available resource block and RBG size for full-duplex communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to adaptation of a first available resource block and RBG size for full-duplex communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of adaptation of a first available resource block and RBG size for full-duplex communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving a first message indicating one or more resource allocation parameters associated with a BWP, the one or more resource allocation parameters including an indication of a first available resource block of the BWP, an indication of an effective size of the BWP, or both. The communications manager 920 may be configured as or otherwise support a means for receiving second message indicating a resource allocation for communicating with a network entity via the BWP during a transmission time interval based on an application of the one or more resource allocation parameters. The communications manager 920 may be configured as or otherwise support a means for communicating with the network entity during the transmission time interval in accordance with the resource allocation.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources, enhanced resource allocation, and more granular FDRA processes.

Figure 10:
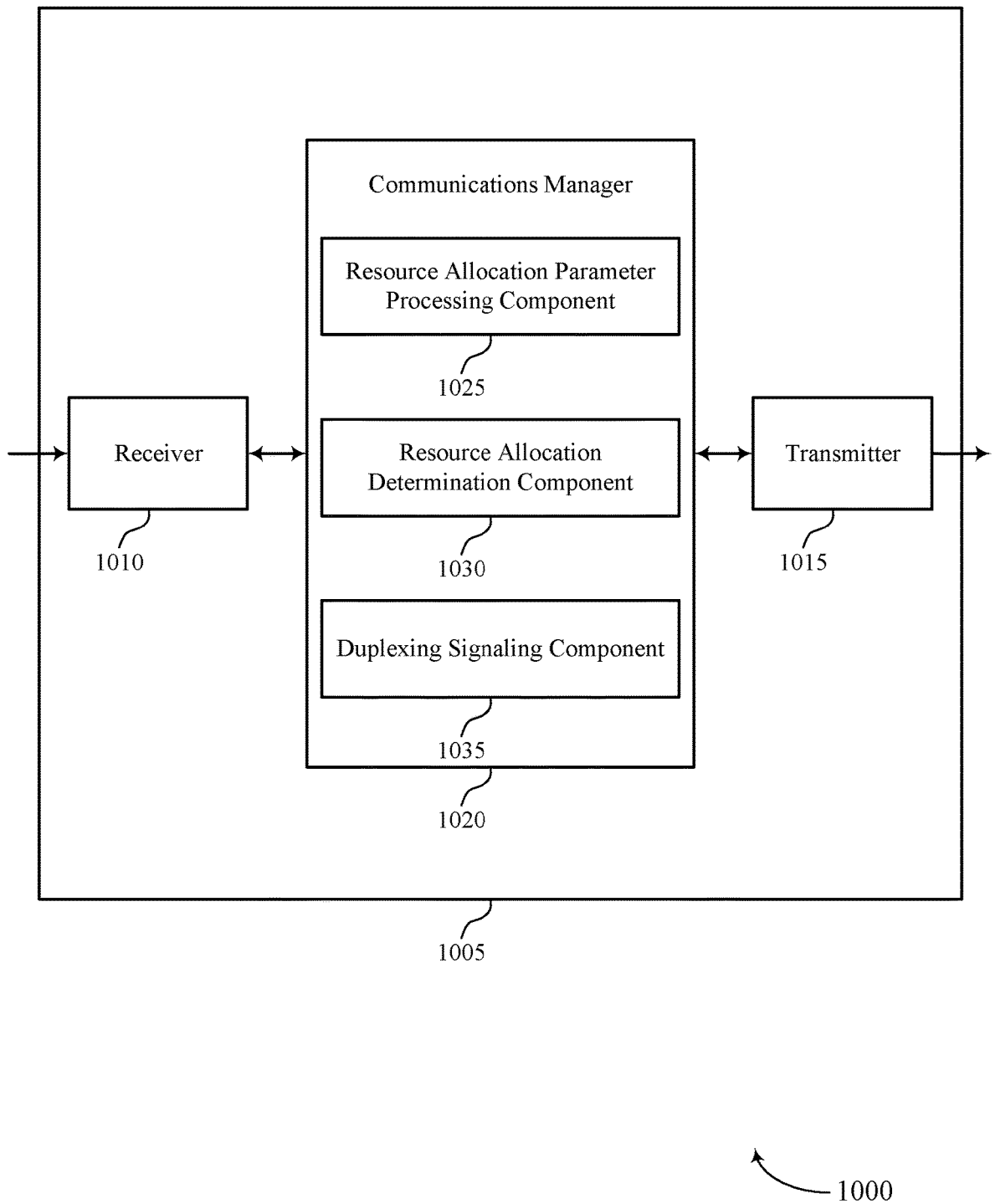

FIG. 10 shows a block diagram 1000 of a device 1005 that supports adaptation of a first available resource block and RBG size for full-duplex communications in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to adaptation of a first available resource block and RBG size for full-duplex communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to adaptation of a first available resource block and RBG size for full-duplex communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of adaptation of a first available resource block and RBG size for full-duplex communications as described herein. For example, the communications manager 1020 may include a resource allocation parameter processing component 1025, a resource allocation determination component 1030, a duplexing signaling component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The resource allocation parameter processing component 1025 may be configured as or otherwise support a means for receiving a first message indicating one or more resource allocation parameters associated with a BWP, the one or more resource allocation parameters including an indication of a first available resource block of the BWP, an indication of an effective size of the BWP, or both. The resource allocation determination component 1030 may be configured as or otherwise support a means for receiving second message indicating a resource allocation for communicating with a network entity via the BWP during a transmission time interval based on an application of the one or more resource allocation parameters. The duplexing signaling component 1035 may be configured as or otherwise support a means for communicating with the network entity during the transmission time interval in accordance with the resource allocation.

Figure 11:
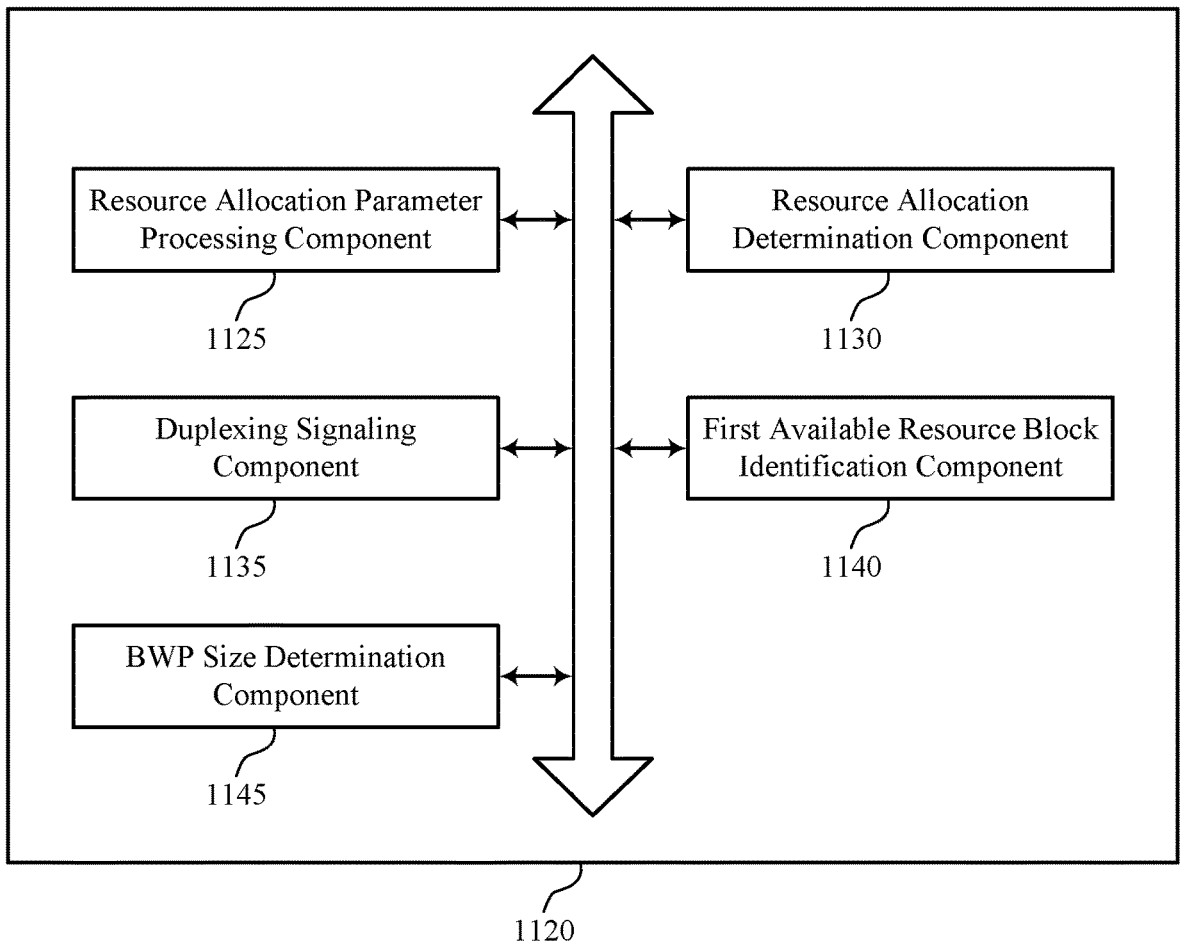
FIG. 11 shows a block diagram of a communications manager that supports adaptation of a first available resource block and RBG size for full-duplex communications in accordance with one or more aspects of the present disclosure.

FIG. 11 shows a block diagram 1100 of a communications manager 1120 that supports adaptation of a first available resource block and RBG size for full-duplex communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of adaptation of a first available resource block and RBG size for full-duplex communications as described herein. For example, the communications manager 1120 may include a resource allocation parameter processing component 1125, a resource allocation determination component 1130, a duplexing signaling component 1135, a first available resource block identification component 1140, a BWP size determination component 1145, or any combination thereof. Each of these components may communicate, directly or indirectly, with one another (e.g., via one or more buses).

The communications manager 1120 may support wireless communication at a UE in accordance with examples as disclosed herein. The resource allocation parameter processing component 1125 may be configured as or otherwise support a means for receiving a first message indicating one or more resource allocation parameters associated with a BWP, the one or more resource allocation parameters including an indication of a first available resource block of the BWP, an indication of an effective size of the BWP, or both. The resource allocation determination component 1130 may be configured as or otherwise support a means for receiving second message indicating a resource allocation for communicating with a network entity via the BWP during a transmission time interval based on an application of the one or more resource allocation parameters. The duplexing signaling component 1135 may be configured as or otherwise support a means for communicating with the network entity during the transmission time interval in accordance with the resource allocation.

In some examples, the transmission time interval is configured for half-duplex communications, and the first available resource block identification component 1140 may be configured as or otherwise support a means for determining, based on the one or more resource allocation parameters, that the first available resource block of the BWP includes a first physical resource block of the BWP, where communicating with the network entity includes. In some examples, the transmission time interval is configured for half-duplex communications, and the duplexing signaling component 1135 may be configured as or otherwise support a means for communicating with the network entity during the transmission time interval in accordance with the resource allocation, where the second message indicates a start and length indicator value that is based on the first available resource block.

In some examples, the transmission time interval is configured for full-duplex communications, and the first available resource block identification component 1140 may be configured as or otherwise support a means for determining, based on the one or more resource allocation parameters, that the first available resource block of the BWP includes a first physical resource block of the BWP that at least partially overlaps with a sub-band corresponding to the transmission time interval, where communicating with the network entity includes. In some examples, the transmission time interval is configured for full-duplex communications, and the duplexing signaling component 1135 may be configured as or otherwise support a means for communicating with the network entity during the transmission time interval in accordance with the resource allocation, where the second message indicates a start and length indicator value based on the first available resource block.

In some examples, the BWP includes a subset of the sub-band of the transmission time interval.

In some examples, the transmission time interval is configured for full-duplex communications, and the first available resource block identification component 1140 may be configured as or otherwise support a means for determining, based on the one or more resource allocation parameters, that the first available resource block of the BWP includes a first physical resource block of the BWP that at least partially overlaps with a first sub-band of a set of sub-bands corresponding to the transmission time interval, where communicating with the network entity includes. In some examples, the transmission time interval is configured for full-duplex communications, and the duplexing signaling component 1135 may be configured as or otherwise support a means for communicating with the network entity during the transmission time interval in accordance with the resource allocation, where the resource allocation is based on the first available resource block.

In some examples, the transmission time interval is configured for half-duplex communications, and the BWP size determination component 1145 may be configured as or otherwise support a means for determining, based on the one or more resource allocation parameters, that the effective size of the BWP includes a total size of the BWP, where communicating with the network entity includes. In some examples, the transmission time interval is configured for half-duplex communications, and the duplexing signaling component 1135 may be configured as or otherwise support a means for communicating with the network entity during the transmission time interval in accordance with the resource allocation, where the resource allocation is based on the effective size of the BWP.

In some examples, the transmission time interval is configured for full-duplex communications, and the BWP size determination component 1145 may be configured as or otherwise support a means for determining, based on the one or more resource allocation parameters, that the BWP at least partially overlaps with a sub-band of the transmission time interval and the effective size of the BWP includes a subset of a total size of BWP that overlaps with the sub-band, where communicating with the network entity includes. In some examples, the transmission time interval is configured for full-duplex communications, and the duplexing signaling component 1135 may be configured as or otherwise support a means for communicating with the network entity during the transmission time interval in accordance with the resource allocation, where the resource allocation is based on the effective size of the BWP.

In some examples, to support receiving the second message, the resource allocation determination component 1130 may be configured as or otherwise support a means for receiving the second message indicating the resource allocation as a bitmap indicating a quantity of RBGs to use for communicating with the network entity, where each bit of the bitmap corresponds to a subset of the quantity of resource blocks based on the effective size of the BWP.

In some examples, the resource allocation includes a first resource allocation type corresponding to the indication of the effective size of the BWP.

In some examples, the resource allocation includes a second resource allocation type corresponding to the indication of the first available resource block of the BWP.

In some examples, the transmission time interval is configured for at least one of half-duplex communications, in-band full-duplex communications, or sub-band full-duplex communications.

In some examples, the BWP includes an uplink BWP or a downlink BWP.

Figure 12:
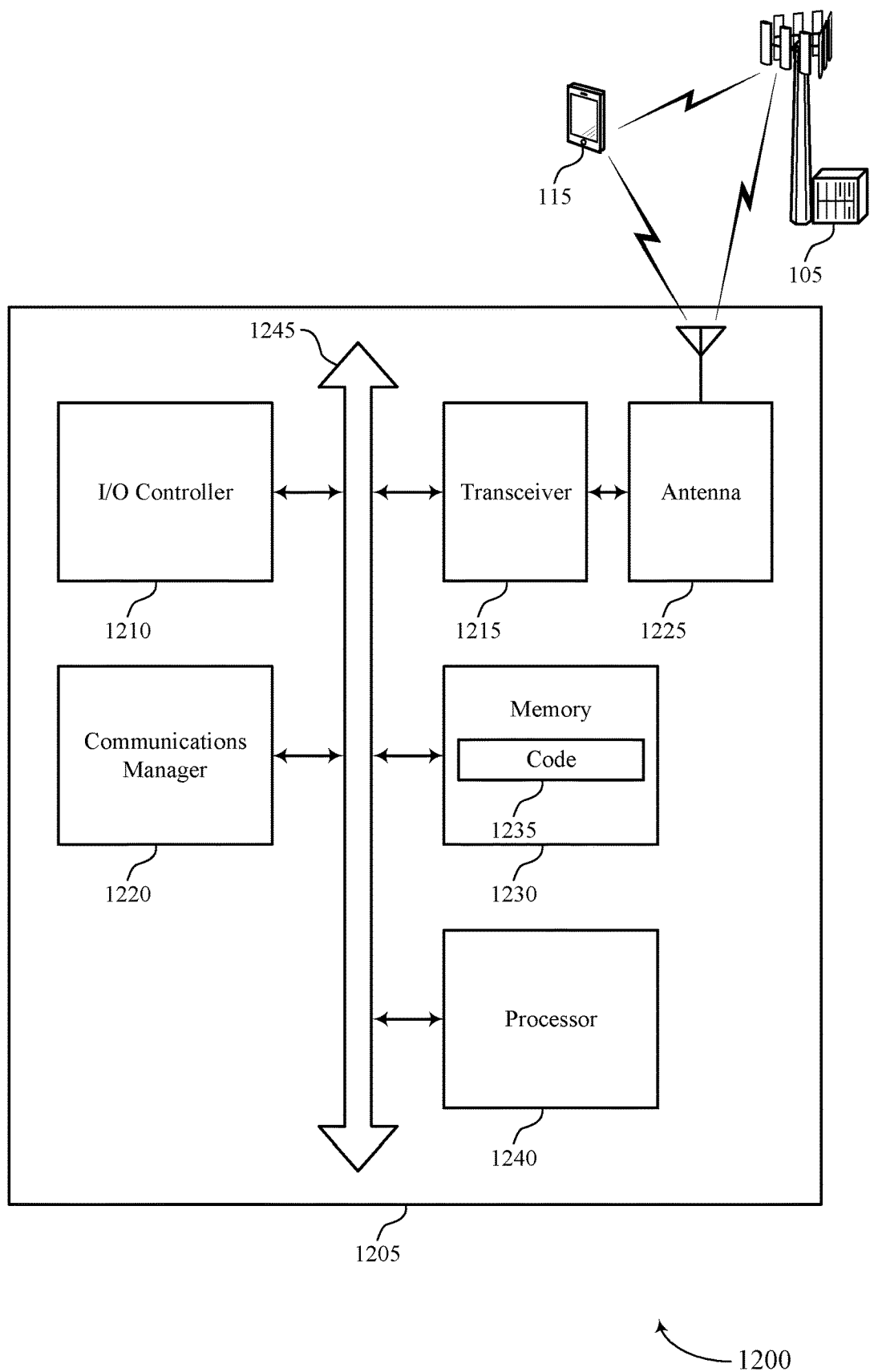
FIG. 12 shows a diagram of a system including a device that supports adaptation of a first available resource block and RBG size for full-duplex communications in accordance with one or more aspects of the present disclosure.

FIG. 12 shows a diagram of a system 1200 including a device 1205 that supports adaptation of a first available resource block and RBG size for full-duplex communications in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting adaptation of a first available resource block and RBG size for full-duplex communications). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a first message indicating one or more resource allocation parameters associated with a BWP, the one or more resource allocation parameters including an indication of a first available resource block of the BWP, an indication of an effective size of the BWP, or both. The communications manager 1220 may be configured as or otherwise support a means for receiving second message indicating a resource allocation for communicating with a network entity via the BWP during a transmission time interval based on an application of the one or more resource allocation parameters. The communications manager 1220 may be configured as or otherwise support a means for communicating with the network entity during the transmission time interval in accordance with the resource allocation.

By including or configuring the communications manager 1220 in accordance with examples as described herein, the device 1205 may support techniques for improved communication reliability, more efficient utilization of communication resources, improved coordination between devices, enhanced FDRA, and increased resource allocation efficiency.

In some examples, the communications manager 1220 may be configured to perform various operations (e.g., receiving, monitoring, transmitting) using or otherwise in cooperation with the transceiver 1215, the one or more antennas 1225, or any combination thereof. In some examples, the communications manager 1220 may be configured to receive or transmit messages or other signaling as described herein via the transceiver 1215. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of adaptation of a first available resource block and RBG size for full-duplex communications as described herein, or the processor 1240 and the memory 1230 may be otherwise configured to perform or support such operations.

Figure 13:
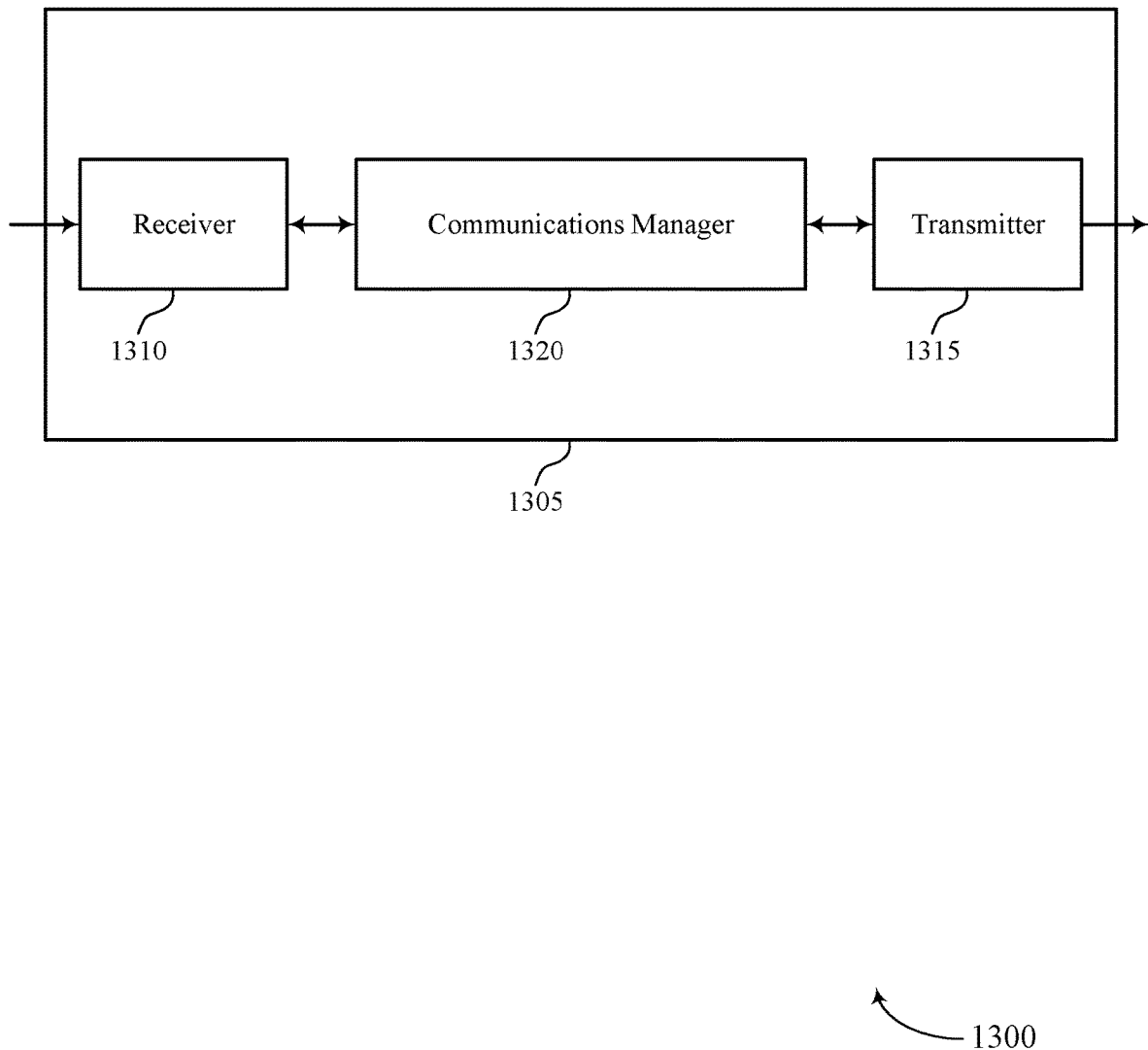
FIGS. 13 and 14 show block diagrams of devices that support adaptation of a first available resource block and RBG size for full-duplex communications in accordance with one or more aspects of the present disclosure.

FIG. 13 shows a block diagram 1300 of a device 1305 that supports adaptation of a first available resource block and RBG size for full-duplex communications in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of adaptation of a first available resource block and RBG size for full-duplex communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. For example, the communications manager 1320 may be configured as or otherwise support a means for transmitting, to a UE a first message indicating one or more resource allocation parameters associated with a BWP, the one or more resource allocation parameters including an indication of a first available resource block of the BWP, an indication of an effective size of the BWP, or both. The communications manager 1320 may be configured as or otherwise support a means for transmitting a second message indicating a resource allocation for communicating with the UE via the BWP during a transmission time interval based on an application of the one or more resource allocation parameters. The communications manager 1320 may be configured as or otherwise support a means for communicating with the UE during the transmission time interval in accordance with the resource allocation.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for more efficient utilization of communication resources, enhanced resource allocation, and more granular FDRA processes.

Figure 14:
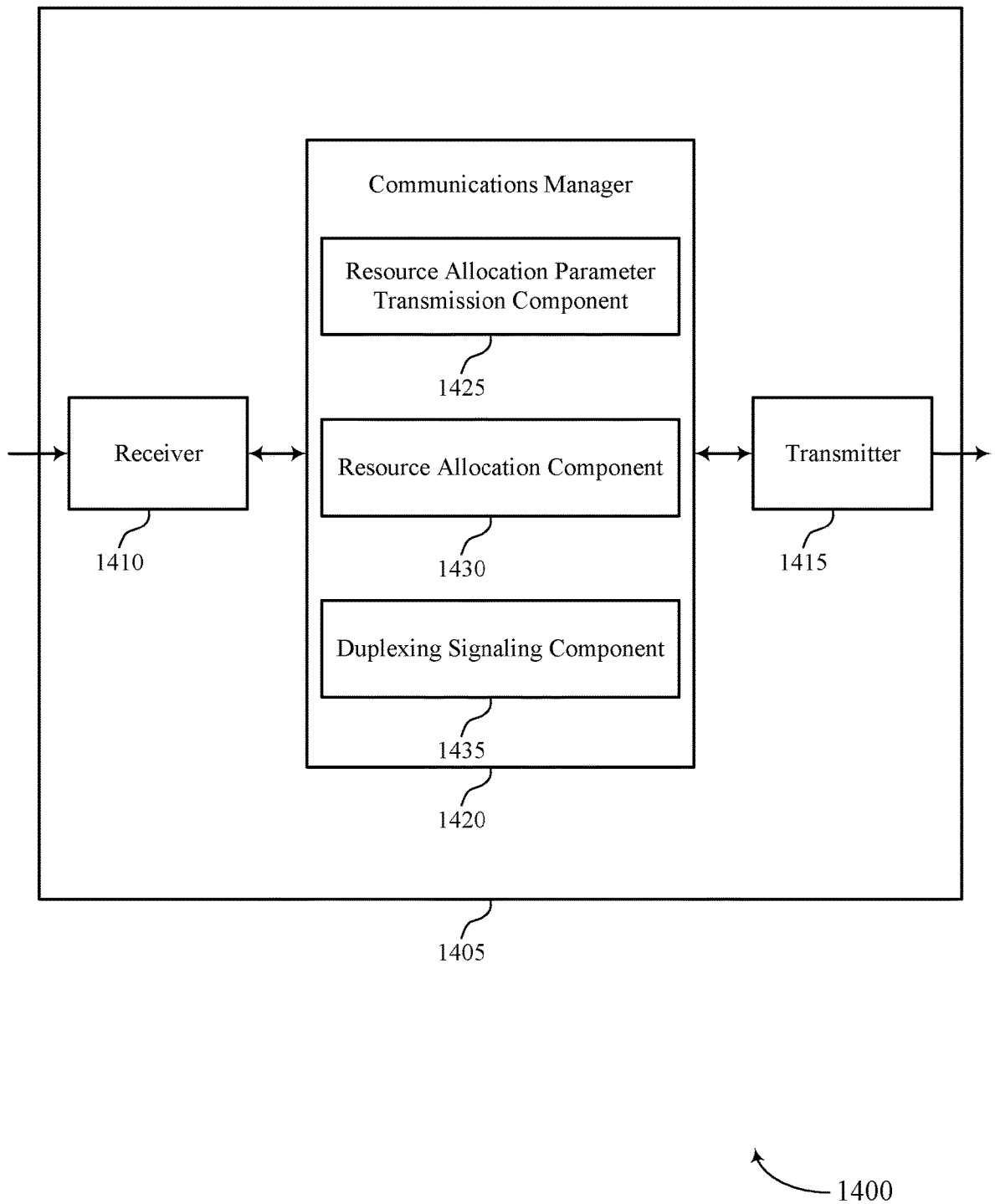

FIG. 14 shows a block diagram 1400 of a device 1405 that supports adaptation of a first available resource block and RBG size for full-duplex communications in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of adaptation of a first available resource block and RBG size for full-duplex communications as described herein. For example, the communications manager 1420 may include a resource allocation parameter transmission component 1425, a resource allocation component 1430, a duplexing signaling component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. The resource allocation parameter transmission component 1425 may be configured as or otherwise support a means for transmitting, to a UE a first message indicating one or more resource allocation parameters associated with a BWP, the one or more resource allocation parameters including an indication of a first available resource block of the BWP, an indication of an effective size of the BWP, or both. The resource allocation component 1430 may be configured as or otherwise support a means for transmitting a second message indicating a resource allocation for communicating with the UE via the BWP during a transmission time interval based on an application of the one or more resource allocation parameters. The duplexing signaling component 1435 may be configured as or otherwise support a means for communicating with the UE during the transmission time interval in accordance with the resource allocation.

Figure 15:
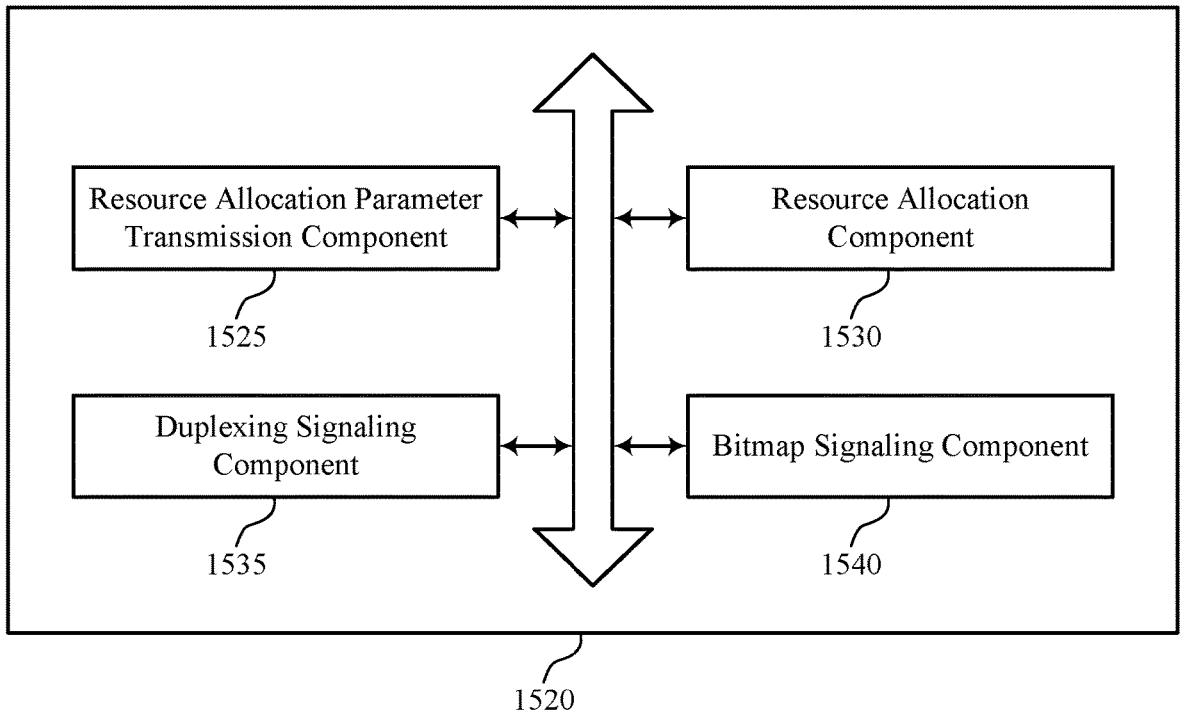
FIG. 15 shows a block diagram of a communications manager that supports adaptation of a first available resource block and RBG size for full-duplex communications in accordance with one or more aspects of the present disclosure.

FIG. 15 shows a block diagram 1500 of a communications manager 1520 that supports adaptation of a first available resource block and RBG size for full-duplex communications in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of adaptation of a first available resource block and RBG size for full-duplex communications as described herein. For example, the communications manager 1520 may include a resource allocation parameter transmission component 1525, a resource allocation component 1530, a duplexing signaling component 1535, a bitmap signaling component 1540, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The resource allocation parameter transmission component 1525 may be configured as or otherwise support a means for transmitting, to a UE a first message indicating one or more resource allocation parameters associated with a BWP, the one or more resource allocation parameters including an indication of a first available resource block of the BWP, an indication of an effective size of the BWP, or both. The resource allocation component 1530 may be configured as or otherwise support a means for transmitting a second message indicating a resource allocation for communicating with the UE via the BWP during a transmission time interval based on an application of the one or more resource allocation parameters. The duplexing signaling component 1535 may be configured as or otherwise support a means for communicating with the UE during the transmission time interval in accordance with the resource allocation.

In some examples, the transmission time interval is configured for half-duplex communications, and the resource allocation parameter transmission component 1525 may be configured as or otherwise support a means for allocating, in accordance with the one or more resource allocation parameters, the first available resource block of the BWP as a first physical resource block of the BWP, where communicating with the UE includes. In some examples, the transmission time interval is configured for half-duplex communications, and the duplexing signaling component 1535 may be configured as or otherwise support a means for communicating with the UE during the transmission time interval in accordance with the resource allocation, where the second message indicates a start and length indicator value that is based on the first available resource block.

In some examples, the transmission time interval is configured for full-duplex communications, and the resource allocation component 1530 may be configured as or otherwise support a means for allocating, in accordance with the one or more resource allocation parameters, the first available resource block of the BWP as a first physical resource block of the BWP that at least partially overlaps with a sub-band of the transmission time interval, where communicating with the UE includes. In some examples, the transmission time interval is configured for full-duplex communications, and the duplexing signaling component 1535 may be configured as or otherwise support a means for communicating with the UE during the transmission time interval in accordance with the resource allocation, where the second message indicates a start and length indicator value based on the first available resource block.

In some examples, the BWP includes a subset of the sub-band of the transmission time interval.

In some examples, the transmission time interval is configured for full-duplex communications, and the resource allocation component 1530 may be configured as or otherwise support a means for allocating, in accordance with the one or more resource allocation parameters, the first available resource block of the BWP as a first physical resource block of the BWP that at least partially overlaps with a first sub-band of a set of sub-bands of the transmission time interval, where communicating with the UE includes. In some examples, the transmission time interval is configured for full-duplex communications, and the duplexing signaling component 1535 may be configured as or otherwise support a means for communicating with the UE during the transmission time interval in accordance with the resource allocation, where the resource allocation is based on the first available resource block.

In some examples, the transmission time interval is configured for half-duplex communications, and the resource allocation component 1530 may be configured as or otherwise support a means for allocating, in accordance with the one or more resource allocation parameters, the effective size of the BWP includes a total size of the BWP in the transmission time interval, where communicating with the UE includes. In some examples, the transmission time interval is configured for half-duplex communications, and the duplexing signaling component 1535 may be configured as or otherwise support a means for communicating with the UE during the transmission time interval in accordance with the resource allocation, where the resource allocation is based on the effective size of the BWP.

In some examples, the transmission time interval is configured for full-duplex communications, and the resource allocation component 1530 may be configured as or otherwise support a means for allocating, in accordance with the one or more resource allocation parameters, the BWP at least partially overlaps with a sub-band of the transmission time interval and the effective size of the BWP includes a subset of a total size of BWP that overlaps with the sub-band, where communicating with the network entity includes. In some examples, the transmission time interval is configured for full-duplex communications, and the duplexing signaling component 1535 may be configured as or otherwise support a means for communicating with the UE during the transmission time interval in accordance with the resource allocation, where the resource allocation is based on the effective size of the BWP.

In some examples, to support transmitting the second message, the bitmap signaling component 1540 may be configured as or otherwise support a means for transmitting the second message indicating the resource allocation as a bitmap indicating a quantity of RBGs to use for communicating with the network entity, where each bit of the bitmap corresponds to a subset of the quantity of resource blocks based on the effective size of the BWP.

In some examples, the resource allocation includes a first resource allocation type corresponding to the indication of the effective size of the BWP.

In some examples, the resource allocation includes a second resource allocation type corresponding to the indication of the first available resource block of the BWP.

In some examples, the transmission time interval is configured for at least one of half-duplex communications, in-band full-duplex communications, or sub-band full-duplex communications.

In some examples, the BWP includes an uplink BWP or a downlink BWP.

Figure 16:
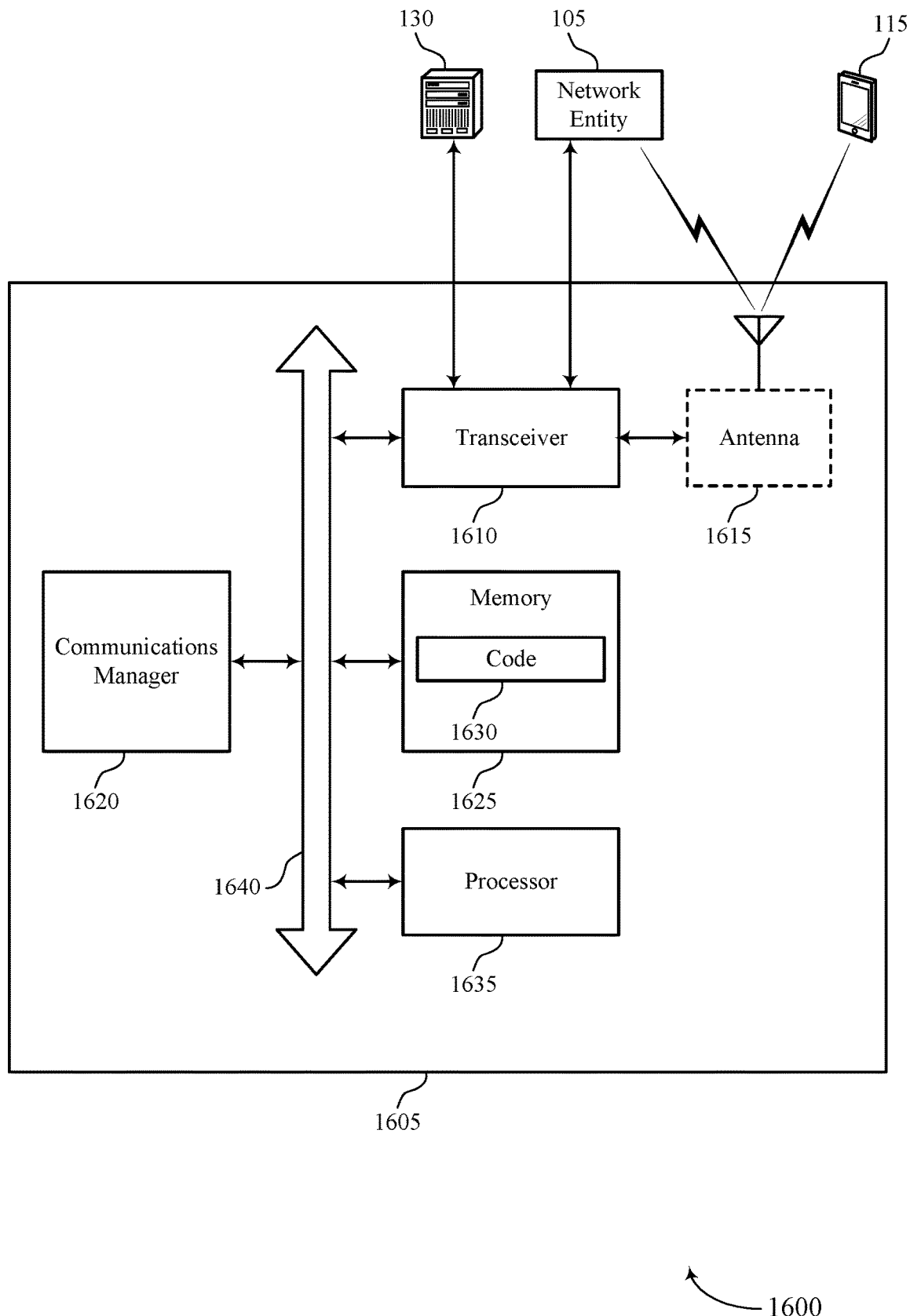
FIG. 16 shows a diagram of a system including a device that supports adaptation of a first available resource block and RBG size for full-duplex communications in accordance with one or more aspects of the present disclosure.

FIG. 16 shows a diagram of a system 1600 including a device 1605 that supports adaptation of a first available resource block and RBG size for full-duplex communications in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a mid-haul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting adaptation of a first available resource block and RBG size for full-duplex communications). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for transmitting, to a UE a first message indicating one or more resource allocation parameters associated with a BWP, the one or more resource allocation parameters including an indication of a first available resource block of the BWP, an indication of an effective size of the BWP, or both. The communications manager 1620 may be configured as or otherwise support a means for transmitting a second message indicating a resource allocation for communicating with the UE via the BWP during a transmission time interval based on an application of the one or more resource allocation parameters. The communications manager 1620 may be configured as or otherwise support a means for communicating with the UE during the transmission time interval in accordance with the resource allocation.

By including or configuring the communications manager 1620 in accordance with examples as described herein, the device 1605 may support techniques for improved communication reliability, more efficient utilization of communication resources, improved coordination between devices, enhanced FDRA, and increased resource allocation efficiency.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. In some examples, the communications manager 1620 may be configured to receive or transmit messages or other signaling as described herein via the transceiver 1610. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of adaptation of a first available resource block and RBG size for full-duplex communications as described herein, or the processor 1635 and the memory 1625 may be otherwise configured to perform or support such operations.

Figure 17:
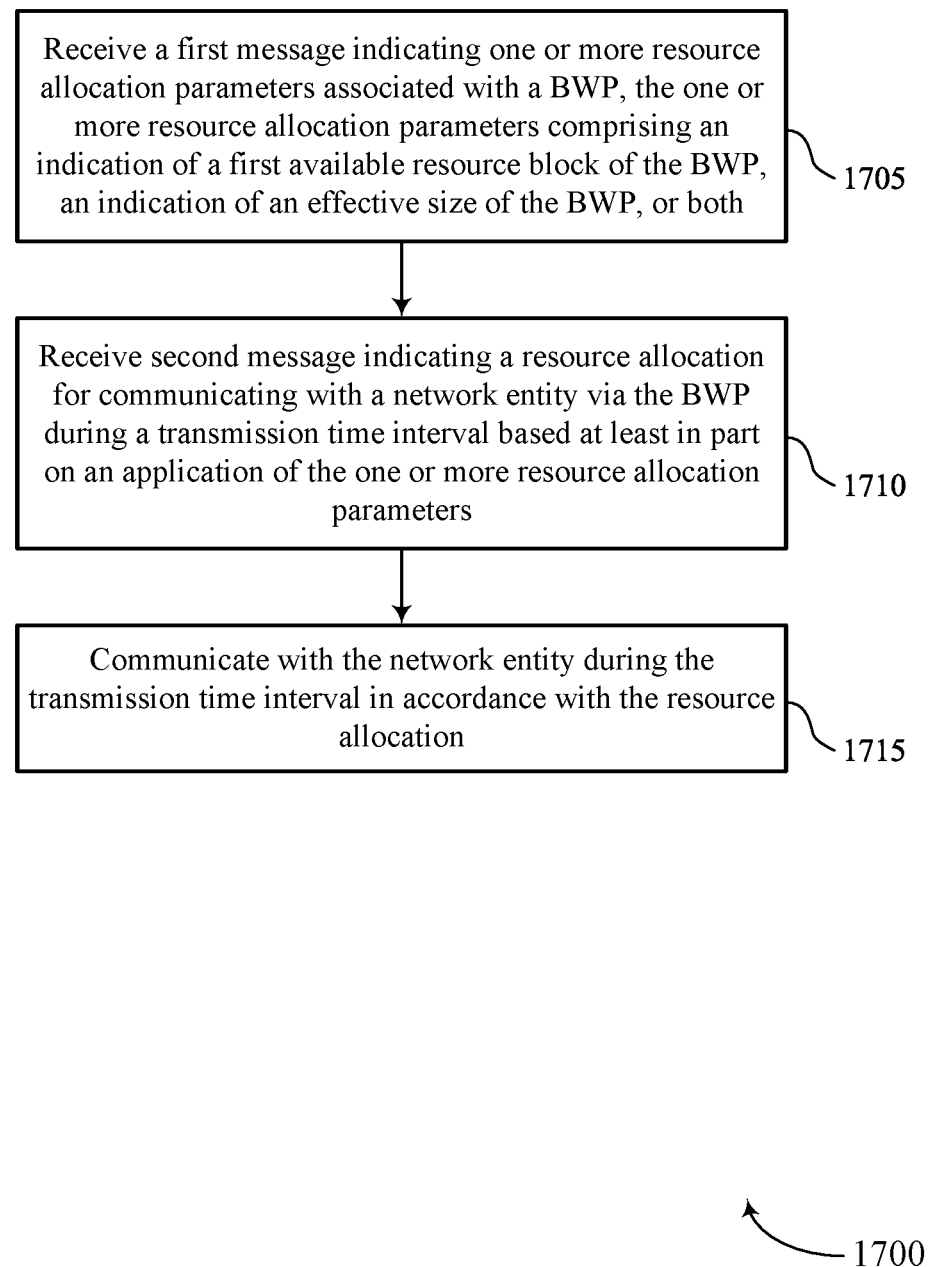
FIGS. 17 and 18 show flowcharts illustrating methods that support adaptation of a first available resource block and RBG size for full-duplex communications in accordance with one or more aspects of the present disclosure.

FIG. 17 shows a flowchart illustrating a method 1700 that supports adaptation of a first available resource block and RBG size for full-duplex communications in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving a first message indicating one or more resource allocation parameters associated with a BWP, the one or more resource allocation parameters including an indication of a first available resource block of the BWP, an indication of an effective size of the BWP, or both. The operations of 1705 may be performed in accordance with examples as disclosed herein. In some examples, aspects of the operations of 1705 may be performed by a resource allocation parameter processing component 1125 as described with reference to FIG. 11. Additionally, or alternatively, means for performing 1705 may, but not necessarily, include, for example, antenna 1225, transceiver 1215, communications manager 1220, memory 1230 (including code 1235), processor 1240 and/or bus 1245.

At 1710, the method may include receiving second message indicating a resource allocation for communicating with a network entity via the BWP during a transmission time interval based on an application of the one or more resource allocation parameters. The operations of 1710 may be performed in accordance with examples as disclosed herein. In some examples, aspects of the operations of 1710 may be performed by a resource allocation determination component 1130 as described with reference to FIG. 11. Additionally, or alternatively, means for performing the 1710 may, but not necessarily, include, for example, antenna 1225, transceiver 1215, communications manager 1220, memory 1230 (including code 1235), processor 1240 and/or bus 1245.

At 1715, the method may include communicating with the network entity during the transmission time interval in accordance with the resource allocation. The operations of 1715 may be performed in accordance with examples as disclosed herein. In some examples, aspects of the operations of 1715 may be performed by a duplexing signaling component 1135 as described with reference to FIG. 11. Additionally, or alternatively, means for performing 1715 may, but not necessarily, include, for example, antenna 1225, transceiver 1215, communications manager 1220, memory 1230 (including code 1235), processor 1240 and/or bus 1245.

Figure 18:
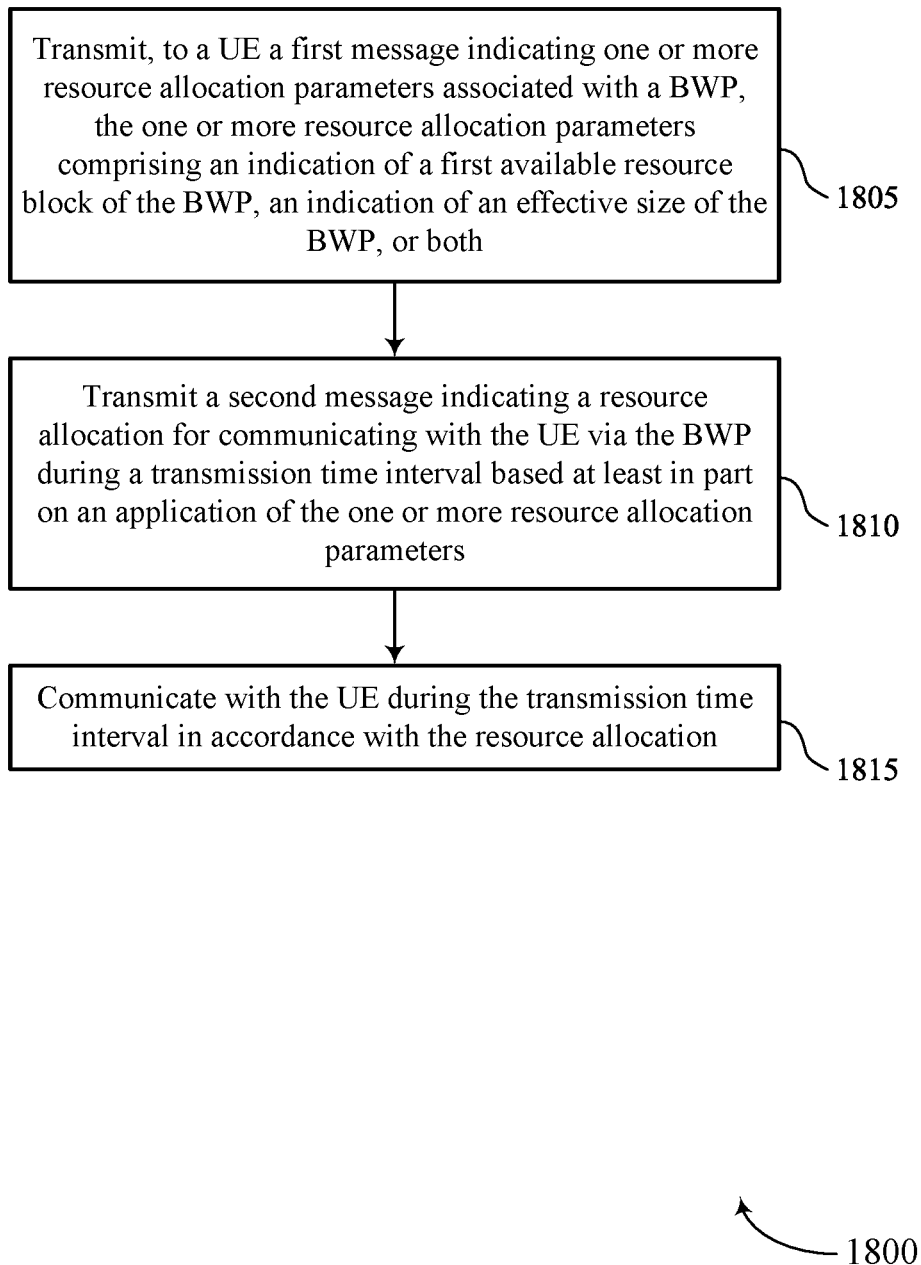

FIG. 18 shows a flowchart illustrating a method 1800 that supports adaptation of a first available resource block and RBG size for full-duplex communications in accordance with one or more aspects of the present disclosure. The operations of the method 1800 may be implemented by a network entity or its components as described herein. For example, the operations of the method 1800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE a first message indicating one or more resource allocation parameters associated with a BWP, the one or more resource allocation parameters including an indication of a first available resource block of the BWP, an indication of an effective size of the BWP, or both. The operations of 1805 may be performed in accordance with examples as disclosed herein. In some examples, aspects of the operations of 1805 may be performed by a resource allocation parameter transmission component 1525 as described with reference to FIG. 15. Additionally, or alternatively, means for performing 1805 may, but not necessarily, include, for example, antenna 1615, transceiver 1610, communications manager 1620, memory 1625 (including code 1630), processor 1635, and/or bus 1640.

At 1810, the method may include transmitting a second message indicating a resource allocation for communicating with the UE via the BWP during a transmission time interval based on an application of the one or more resource allocation parameters. The operations of 1810 may be performed in accordance with examples as disclosed herein. In some examples, aspects of the operations of 1810 may be performed by a resource allocation component 1530 as described with reference to FIG. 15. Additionally, or alternatively, means for performing 1810 may, but not necessarily, include, for example, antenna 1615, transceiver 1610, communications manager 1620, memory 1625 (including code 1630), processor 1635, and/or bus 1640.

At 1815, the method may include communicating with the UE during the transmission time interval in accordance with the resource allocation. The operations of 1815 may be performed in accordance with examples as disclosed herein. In some examples, aspects of the operations of 1815 may be performed by a duplexing signaling component 1535 as described with reference to FIG. 15. Additionally, or alternatively, means for performing 1815 may, but not necessarily, include, for example, antenna 1615, transceiver 1610, communications manager 1620, memory 1625 (including code 1630), processor 1635, and/or bus 1640.

The following provides an overview of aspects of the present disclosure:

Aspect 1: A method for wireless communication at a UE, comprising: receiving a first message indicating one or more resource allocation parameters associated with a BWP, the one or more resource allocation parameters comprising an indication of a first available resource block of the BWP, an indication of an effective size of the BWP, or both; receiving second message indicating a resource allocation for communicating with a network entity via the BWP during a TTI based at least in part on an application of the one or more resource allocation parameters; and communicating with the network entity during the TTI in accordance with the resource allocation.

Aspect 2: The method of aspect 1, wherein the TTI is configured for half-duplex communications, the method further comprising: determining, based at least in part on the one or more resource allocation parameters, that the first available resource block of the BWP comprises a first PRB of the BWP, wherein communicating with the network entity comprises: communicating with the network entity during the TTI in accordance with the resource allocation, wherein the second message indicates a SLIV that is based at least in part on the first available resource block.

Aspect 3: The method of any of aspects 1 through 2, wherein the TTI is configured for full-duplex communications, the method further comprising: determining, based at least in part on the one or more resource allocation parameters, that the first available resource block of the BWP comprises a first PRB of the BWP that at least partially overlaps with a sub-band corresponding to the TTI, wherein communicating with the network entity comprises: communicating with the network entity during the TTI in accordance with the resource allocation, wherein the second message indicates a SLIV based at least in part on the first available resource block.

Aspect 4: The method of aspect 3, wherein the BWP comprises a subset of the sub-band of the TTI.

Aspect 5: The method of any of aspects 1 through 4, wherein the TTI is configured for full-duplex communications, the method further comprising: determining, based at least in part on the one or more resource allocation parameters, that the first available resource block of the BWP comprises a first PRB of the BWP that at least partially overlaps with a first sub-band of a set of sub-bands corresponding to the TTI, wherein communicating with the network entity comprises: communicating with the network entity during the TTI in accordance with the resource allocation, wherein the resource allocation is based at least in part on the first available resource block.

Aspect 6: The method of any of aspects 1 through 5, wherein the TTI is configured for half-duplex communications, the method further comprising: determining, based at least in part on the one or more resource allocation parameters, that the effective size of the BWP comprises a total size of the BWP, wherein communicating with the network entity comprises: communicating with the network entity during the TTI in accordance with the resource allocation, wherein the resource allocation is based at least in part on the effective size of the BWP.

Aspect 7: The method of any of aspects 1 through 6, wherein the TTI is configured for full-duplex communications, the method further comprising: determining, based at least in part on the one or more resource allocation parameters, that the BWP at least partially overlaps with a sub-band of the TTI and the effective size of the BWP comprises a subset of a total size of BWP that overlaps with the sub-band, wherein communicating with the network entity comprises: communicating with the network entity during the TTI in accordance with the resource allocation, wherein the resource allocation is based at least in part on the effective size of the BWP.

Aspect 8: The method of aspect 7, wherein receiving the second message further comprises: receiving the second message indicating the resource allocation as a bitmap indicating a quantity of resource block groups to use for communicating with the network entity, wherein each bit of the bitmap corresponds to a subset of the quantity of resource blocks based at least in part on the effective size of the BWP.

Aspect 9: The method of any of aspects 1 through 8, wherein the resource allocation comprises a first resource allocation type corresponding to the indication of the effective size of the BWP.

Aspect 10: The method of any of aspects 1 through 9, wherein the resource allocation comprises a second resource allocation type corresponding to the indication of the first available resource block of the BWP.

Aspect 11: The method of any of aspects 1 through 10, wherein the TTI is configured for at least one of half duplex communications, in-band full duplex communications, or sub-band full duplex communications.

Aspect 12: The method of any of aspects 1 through 11, wherein the BWP comprises an uplink BWP or a downlink BWP.

Aspect 13: A method for wireless communication at a network entity, comprising: transmitting, to a UE a first message indicating one or more resource allocation parameters associated with a BWP, the one or more resource allocation parameters comprising an indication of a first available resource block of the BWP, an indication of an effective size of the BWP, or both; transmitting a second message indicating a resource allocation for communicating with the UE via the BWP during a TTI based at least in part on an application of the one or more resource allocation parameters; and communicating with the UE during the TTI in accordance with the resource allocation.

Aspect 14: The method of aspect 13, wherein the TTI is configured for half-duplex communications, the method further comprising: allocating, in accordance with the one or more resource allocation parameters, the first available resource block of the BWP as a first PRB of the BWP, wherein communicating with the UE comprises: communicating with the UE during the TTI in accordance with the resource allocation, wherein the second message indicates a SLIV that is based at least in part on the first available resource block.

Aspect 15: The method of any of aspects 13 through 14, wherein the TTI is configured for full-duplex communications, the method further comprising: allocating, in accordance with the one or more resource allocation parameters, the first available resource block of the BWP as a first PRB of the BWP that at least partially overlaps with a sub-band of the TTI, wherein communicating with the UE comprises: communicating with the UE during the TTI in accordance with the resource allocation, wherein the second message indicates a SLIV based at least in part on the first available resource block.

Aspect 16: The method of aspect 15, wherein the BWP comprises a subset of the sub-band of the TTI.

Aspect 17: The method of any of aspects 13 through 16, wherein the TTI is configured for full-duplex communications, the method further comprising: allocating, in accordance with the one or more resource allocation parameters, the first available resource block of the BWP as a first PRB of the BWP that at least partially overlaps with a first sub-band of a set of sub-bands of the TTI, wherein communicating with the UE comprises: communicating with the UE during the TTI in accordance with the resource allocation, wherein the resource allocation is based at least in part on the first available resource block.

Aspect 18: The method of any of aspects 13 through 17, wherein the TTI is configured for half-duplex communications, the method further comprising: allocating, in accordance with the one or more resource allocation parameters, the effective size of the BWP comprises a total size of the BWP in the TTI, wherein communicating with the UE comprises: communicating with the UE during the TTI in accordance with the resource allocation, wherein the resource allocation is based at least in part on the effective size of the BWP.

Aspect 19: The method of any of aspects 13 through 18, wherein the TTI is configured for full-duplex communications, the method further comprising: allocating, in accordance with the one or more resource allocation parameters, the BWP at least partially overlaps with a sub-band of the TTI and the effective size of the BWP comprises a subset of a total size of BWP that overlaps with the sub-band, wherein communicating with the network entity comprises: communicating with the UE during the TTI in accordance with the resource allocation, wherein the resource allocation is based at least in part on the effective size of the BWP.

Aspect 20: The method of aspect 19, wherein transmitting the second message further comprises: transmitting the second message indicating the resource allocation as a bitmap indicating a quantity of resource block groups to use for communicating with the network entity, wherein each bit of the bitmap corresponds to a subset of the quantity of resource blocks based at least in part on the effective size of the BWP.

Aspect 21: The method of any of aspects 13 through 20, wherein the resource allocation comprises a first resource allocation type corresponding to the indication of the effective size of the BWP.

Aspect 22: The method of any of aspects 13 through 21, wherein the resource allocation comprises a second resource allocation type corresponding to the indication of the first available resource block of the BWP.

Aspect 23: The method of any of aspects 13 through 22, wherein the TTI is configured for at least one of half duplex communications, in-band full duplex communications, or sub-band full duplex communications.

Aspect 24: The method of any of aspects 13 through 23, wherein the BWP comprises an uplink BWP or a downlink BWP.

Aspect 25: An apparatus comprising a memory, a transceiver, and at least one processor of a UE, the at least one processor coupled with the memory and the transceiver, the at least one processor configured to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus comprising a memory, a transceiver, and at least one processor of a network entity, the at least one processor coupled with the memory and the transceiver, the at least one processor configured to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
  receiving a first message indicating one or more resource allocation parameters associated with a bandwidth part (BWP), the one or more resource allocation parameters being based at least in part on half-duplex communications or full-duplex communications performed by the UE, and comprising an indication of a first available resource block of the BWP, an indication of an effective size of the BWP, or both;
  receiving a second message indicating a resource allocation for communicating with a network entity via the BWP during a transmission time interval based at least in part on an application of the one or more resource allocation parameters, wherein the BWP at least partially overlaps with a sub-band of the transmission time interval when the transmission time interval is configured for the full-duplex communications, and the effective size of the BWP comprises a subset of a total size of BWP that overlaps with the sub-band; and
  communicating with the network entity during the transmission time interval in accordance with the resource allocation, wherein the resource allocation is based at least in part on the effective size of the BWP.

2. The method of claim 1, further comprising:
  determining, based at least in part on the one or more resource allocation parameters, that the first available resource block of the BWP comprises a first physical resource block of the BWP when the transmission time interval is configured for the half-duplex communications, wherein communicating with the network entity comprises:
    communicating with the network entity during the transmission time interval in accordance with the resource allocation, wherein the second message indicates a start and length indicator value that is based at least in part on the first available resource block.

3. The method of claim 1, further comprising:
  determining, based at least in part on the one or more resource allocation parameters, that the first available resource block of the BWP comprises a first physical resource block of the BWP that at least partially overlaps with a sub-band corresponding to the transmission time interval when the transmission time interval is configured for the full-duplex communications, wherein communicating with the network entity comprises:
    communicating with the network entity during the transmission time interval in accordance with the resource allocation, wherein the second message indicates a start and length indicator value based at least in part on the first available resource block.

4. The method of claim 3, wherein the BWP comprises a subset of the sub-band of the transmission time interval.

5. The method of claim 1, further comprising:
  determining, based at least in part on the one or more resource allocation parameters, that the first available resource block of the BWP comprises a first physical resource block of the BWP that at least partially overlaps with a first sub-band of a set of sub-bands corresponding to the transmission time interval when the transmission time interval is configured for the full-duplex communications, wherein communicating with the network entity comprises:
    communicating with the network entity during the transmission time interval in accordance with the resource allocation, wherein the resource allocation is based at least in part on the first available resource block.

6. The method of claim 1, further comprising:
  determining, based at least in part on the one or more resource allocation parameters, that the effective size of the BWP comprises a total size of the BWP when the transmission time interval is configured for the half-duplex communications, wherein communicating with the network entity comprises:
    communicating with the network entity during the transmission time interval in accordance with the resource allocation, wherein the resource allocation is based at least in part on the effective size of the BWP.

7. The method of claim 1, wherein receiving the second message further comprises:
  receiving the second message indicating the resource allocation as a bitmap indicating a quantity of resource block groups to use for communicating with the network entity, wherein each bit of the bitmap corresponds to a subset of the quantity of resource blocks based at least in part on the effective size of the BWP.

8. The method of claim 1, wherein the resource allocation comprises a first resource allocation type corresponding to the indication of the effective size of the BWP.

9. The method of claim 1, wherein the resource allocation comprises a second resource allocation type corresponding to the indication of the first available resource block of the BWP.

10. The method of claim 1, wherein the transmission time interval is configured for the half-duplex communications or the full-duplex communications, and wherein the full-duplex communications comprise in-band full-duplex communications or sub-band full-duplex communications.

11. The method of claim 1, wherein the BWP comprises an uplink BWP or a downlink BWP.

12. A method for wireless communication at a network entity, comprising:
  transmitting, to a user equipment (UE), a first message indicating one or more resource allocation parameters associated with a bandwidth part (BWP), the one or more resource allocation parameters being based at least in part on half-duplex communications or full-duplex communications, and comprising an indication of a first available resource block of the BWP, an indication of an effective size of the BWP, or both;
  transmitting a second message indicating a resource allocation for communicating with the UE via the BWP during a transmission time interval based at least in part on an application of the one or more resource allocation parameters, wherein the BWP that at least partially overlaps with a sub-band of the transmission time interval when the transmission time interval is configured for the full-duplex communications, and the effective size of the BWP comprises a subset of a total size of BWP that overlaps with the sub-band; and communicating with the UE during the transmission time interval in accordance with the resource allocation, wherein the resource allocation is based at least in part on the effective size of the BWP.

13. The method of claim 12, further comprising:
allocating, in accordance with the one or more resource allocation parameters, the first available resource block of the BWP as a first physical resource block of the BWP when the transmission time interval is configured for the half-duplex communications, wherein communicating with the UE comprises:
   communicating with the UE during the transmission time interval in accordance with the resource allocation, wherein the second message indicates a start and length indicator value that is based at least in part on the first available resource block.

14. The method of claim 12, further comprising:
allocating, in accordance with the one or more resource allocation parameters, the first available resource block of the BWP as a first physical resource block of the BWP that at least partially overlaps with a sub-band of the transmission time interval when the transmission time interval is configured for the full-duplex communications, wherein communicating with the UE comprises:
   communicating with the UE during the transmission time interval in accordance with the resource allocation, wherein the second message indicates a start and length indicator value based at least in part on the first available resource block.

15. The method of claim 14, wherein the BWP comprises a subset of the sub-band of the transmission time interval.

16. The method of claim 12, further comprising:
allocating, in accordance with the one or more resource allocation parameters, the first available resource block of the BWP as a first physical resource block of the BWP that at least partially overlaps with a first sub-band of a set of sub-bands of the transmission time interval when the transmission time interval is configured for the full-duplex communications, wherein communicating with the UE comprises:
   communicating with the UE during the transmission time interval in accordance with the resource allocation, wherein the resource allocation is based at least in part on the first available resource block.

17. The method of claim 12, further comprising:
allocating, in accordance with the one or more resource allocation parameters, the effective size of the BWP comprises a total size of the BWP in the transmission time interval when the transmission time interval is configured for the half-duplex communications, wherein communicating with the UE comprises:
   communicating with the UE during the transmission time interval in accordance with the resource allocation, wherein the resource allocation is based at least in part on the effective size of the BWP.

18. The method of claim 12, wherein transmitting the second message comprises:
transmitting the second message indicating the resource allocation as a bitmap indicating a quantity of resource block groups to use for communicating with the network entity, wherein each bit of the bitmap corresponds to a subset of the quantity of resource blocks based at least in part on the effective size of the BWP.

19. An apparatus for wireless communication at a user equipment (UE), comprising:
one or more memories;
a transceiver; and
at least one processor of the UE, the at least one processor coupled with the one or more memories and the transceiver, and the at least one processor configured to:
   receive, via the transceiver, a first message indicating one or more resource allocation parameters associated with a bandwidth part (BWP), the one or more resource allocation parameters being based at least in part on half-duplex communications or full-duplex communications performed by the UE, and comprising an indication of a first available resource block of the BWP, an indication of an effective size of the BWP, or both;
   receive, via the transceiver, a second message indicating a resource allocation for communicating with a network entity via the BWP during a transmission time interval based at least in part on an application of the one or more resource allocation parameters, wherein the BWP at least partially overlaps with a sub-band of the transmission time interval when the transmission time interval is configured for the full-duplex communications, and the effective size of the BWP comprises a subset of a total size of BWP that overlaps with the sub-band; and
   communicate with the network entity via the transceiver during the transmission time interval in accordance with the resource allocation, wherein the resource allocation is based at least in part on the effective size of the BWP.

* * * * *